(12) United States Patent
Lee

(10) Patent No.: US 11,363,212 B2
(45) Date of Patent: Jun. 14, 2022

(54) EXPOSURE CONTROL DEVICE, EXPOSURE CONTROL METHOD, PROGRAM, IMAGING DEVICE, AND MOBILE BODY

(71) Applicant: Sony Corporation, Tokyo (JP)

(72) Inventor: Shun Lee, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/040,057

(22) PCT Filed: Mar. 15, 2019

(86) PCT No.: PCT/JP2019/010758
§ 371 (c)(1),
(2) Date: Sep. 22, 2020

(87) PCT Pub. No.: WO2019/188390
PCT Pub. Date: Oct. 3, 2019

(65) Prior Publication Data
US 2021/0029287 A1 Jan. 28, 2021

(30) Foreign Application Priority Data
Mar. 29, 2018 (JP) .............................. JP2018-064978

(51) Int. Cl.
*H04N 5/235* (2006.01)
*H04N 5/232* (2006.01)
*G03B 7/091* (2021.01)

(52) U.S. Cl.
CPC ......... *H04N 5/2353* (2013.01); *H04N 5/2351* (2013.01)

(58) Field of Classification Search
CPC ..................... H04N 5/2353; H04N 5/2351
See application file for complete search history.

(56) References Cited

U.S. PATENT DOCUMENTS

2005/0226508 A1   10/2005   Gotohda
2006/0198626 A1   9/2006    Nakamura
(Continued)

FOREIGN PATENT DOCUMENTS

CN   104320654 A   1/2015
CN   105227857 A   1/2016
(Continued)

OTHER PUBLICATIONS

International Search Report and Written Opinion dated May 28, 2019 for PCT/JP2019/010758 filed on Mar. 15, 2019, 9 pages including English Translation of the International Search Report.
(Continued)

*Primary Examiner* — Christopher K Peterson
(74) *Attorney, Agent, or Firm* — Xsensus LLP

(57) ABSTRACT

The present technology relates to an exposure control device, an exposure control method, a program, an imaging device, and a mobile body that allow for appropriate exposure control.
The exposure control device includes: a wave-detection unit that calculates a wave-detection value, in a captured image taken by an imaging unit, by assigning a smaller weight to an area that is predicted to go out of an angle of view of the imaging unit within a predetermined time; and an exposure control unit that performs exposure control of the imaging unit on the basis of the wave-detection value. The present technology can be applied to, for example, an imaging device or an imaging system provided in a mobile body such as a vehicle, a robot, or the like.

15 Claims, 17 Drawing Sheets

(56) References Cited

U.S. PATENT DOCUMENTS

2014/0204267 A1* 7/2014 Akiba .................... B60R 1/00
                                                    348/362
2017/0267178 A1   9/2017 Shiga

FOREIGN PATENT DOCUMENTS

| EP | 1895779 A2 | 3/2008 |
| EP | 2910971 A1 | 8/2015 |
| JP | 2014-143547 A | 8/2014 |
| JP | 2017-005678 A | 1/2017 |
| JP | 6501091 B1 | 4/2019 |
| WO | WO-2015178497 A1 | 11/2015 |
| WO | 2017/203794 A1 | 11/2017 |

OTHER PUBLICATIONS

Gan Yuquan et al., "An automatic exposure algorithm using scene analysis", Microcomputer Information, vol. 25, Apr. 25, 2009, pp. 303-305.

* cited by examiner

FIG. 10

| TYPE OF SUBJECT | $\phi_i$ |
|---|---|
| SKY | 0 |
| PERSON | 5 |
| VEHICLE | 5 |
| TREE | 1 |
| ROAD SURFACE | 4 |
| SIGN | 5 |
| ⋮ | ⋮ |

EXPOSURE CONTROL DEVICE, EXPOSURE CONTROL METHOD, PROGRAM, IMAGING DEVICE, AND MOBILE BODY

CROSS-REFERENCE TO RELATED APPLICATION

The present application is based on PCT filing PCT/JP2019/010758, filed Mar. 15, 2019, which claims priority to JP 2018-064978, filed Mar. 29, 2018, the entire contents of each are incorporated herein by reference.

TECHNICAL FIELD

The present technology relates to an exposure control device, an exposure control method, a program, an imaging device, and a mobile body, and particularly relates to an exposure control device, an exposure control method, a program, an imaging device, and a mobile body suitable for use in auto exposure.

BACKGROUND ART

Conventionally, there has been proposed defining a distant small frame in which a distant vehicle is expected to be running with respect to a distant road vanishing point in the driving direction of a subject vehicle, and performing exposure control of an in-vehicle camera on the basis of information regarding the brightness within the distant small frame (see Patent Document 1, for example).

CITATION LIST

Patent Document

Patent Document 1: Japanese Patent Application Laid-Open No. 2017-5678

SUMMARY OF THE INVENTION

Problems to be Solved by the Invention

Meanwhile, for example, when the brightness of the surroundings abruptly changes near the entrance, exit, or the like of a tunnel, the exposure control of the in-vehicle camera may fail to be timely performed, causing a captured image to have blown-out highlights in a bright area or blocked-up shadows in a dark area. Patent Document 1 does not give consideration to measures against this problem.

The present technology has been made in view of such circumstances, and is intended to achieve appropriate exposure control.

Solutions to Problems

An exposure control device according to a first aspect of the present technology includes: a wave-detection unit that calculates a wave-detection value, in a captured image taken by an imaging unit, by assigning a smaller weight to an area that is predicted to go out of an angle of view of the imaging unit within a predetermined time; and an exposure control unit that performs exposure control of the imaging unit on the basis of the wave-detection value.

An exposure control method according to the first aspect of the present technology includes: calculating a wave-detection value, in a captured image taken by an imaging unit, by assigning a smaller weight to an area that is predicted to go out of an angle of view of the imaging unit within a predetermined time; and performing exposure control of the imaging unit on the basis of the wave-detection value.

A program according to the first aspect of the present technology is configured to cause a computer to execute processes of: calculating a wave-detection value, in a captured image taken by an imaging unit, by assigning a smaller weight to an area that is predicted to go out of an angle of view of the imaging unit within a predetermined time; and performing exposure control of the imaging unit on the basis of the wave-detection value.

An imaging device according to a second aspect of the present technology includes: an imaging unit; a wave-detection unit that calculates a wave-detection value, in a captured image taken by the imaging unit, by assigning a smaller weight to an area that is predicted to go out of an angle of view of the imaging unit within a predetermined time; and an exposure control unit that performs exposure control of the imaging unit on the basis of the wave-detection value.

A mobile body according to a third aspect of the present technology includes: an imaging unit; a wave-detection unit that calculates a wave-detection value, in a captured image taken by the imaging unit, by assigning a smaller weight to an area that is predicted to go out of an angle of view of the imaging unit within a predetermined time; an exposure control unit that performs exposure control of the imaging unit on the basis of the wave-detection value; and a movement control unit that performs movement control on the basis of the captured image.

In the first aspect and the second aspect of the present technology, a wave-detection value is calculated, in a captured image taken by an imaging unit, by assigning a smaller weight to an area that is predicted to go out of an angle of view of the imaging unit within a predetermined time, and exposure control of the imaging unit is performed on the basis of the wave-detection value.

In the second aspect of the present technology, a wave-detection value is calculated, in a captured image taken by an imaging unit, by assigning a smaller weight to an area that is predicted to go out of an angle of view of the imaging unit within a predetermined time, and exposure control of the imaging unit is performed on the basis of the wave-detection value.

In the third aspect of the present technology, a wave-detection value is calculated, in a captured image taken by an imaging unit, by assigning a smaller weight to an area that is predicted to go out of an angle of view of the imaging unit within a predetermined time, exposure control of the imaging unit is performed on the basis of the wave-detection value, and movement control is performed on the basis of the captured image.

Effects of the Invention

According to the first aspect or the second aspect of the present technology, exposure control can be appropriately performed.

According to the third aspect of the present technology, exposure control can be appropriately performed. As a result, movement of a mobile body can be appropriately controlled.

Note that the effects described above are not restrictive, and any of effects described in the present disclosure may be included.

BRIEF DESCRIPTION OF DRAWINGS

FIG. 10 is a diagram illustrating an example of a parameter table.

MODE FOR CARRYING OUT THE INVENTION

A mode for carrying out the present technology will now be described. Descriptions are provided in the order mentioned below.

1. Example configuration of mobile body control system
2. First embodiment (example of using weighted average of brightness)
3. Second embodiment (example of setting wave-detection area)
4. Modifications
5. Others

1. Example Configuration of Mobile Body Control System

Figure 1:
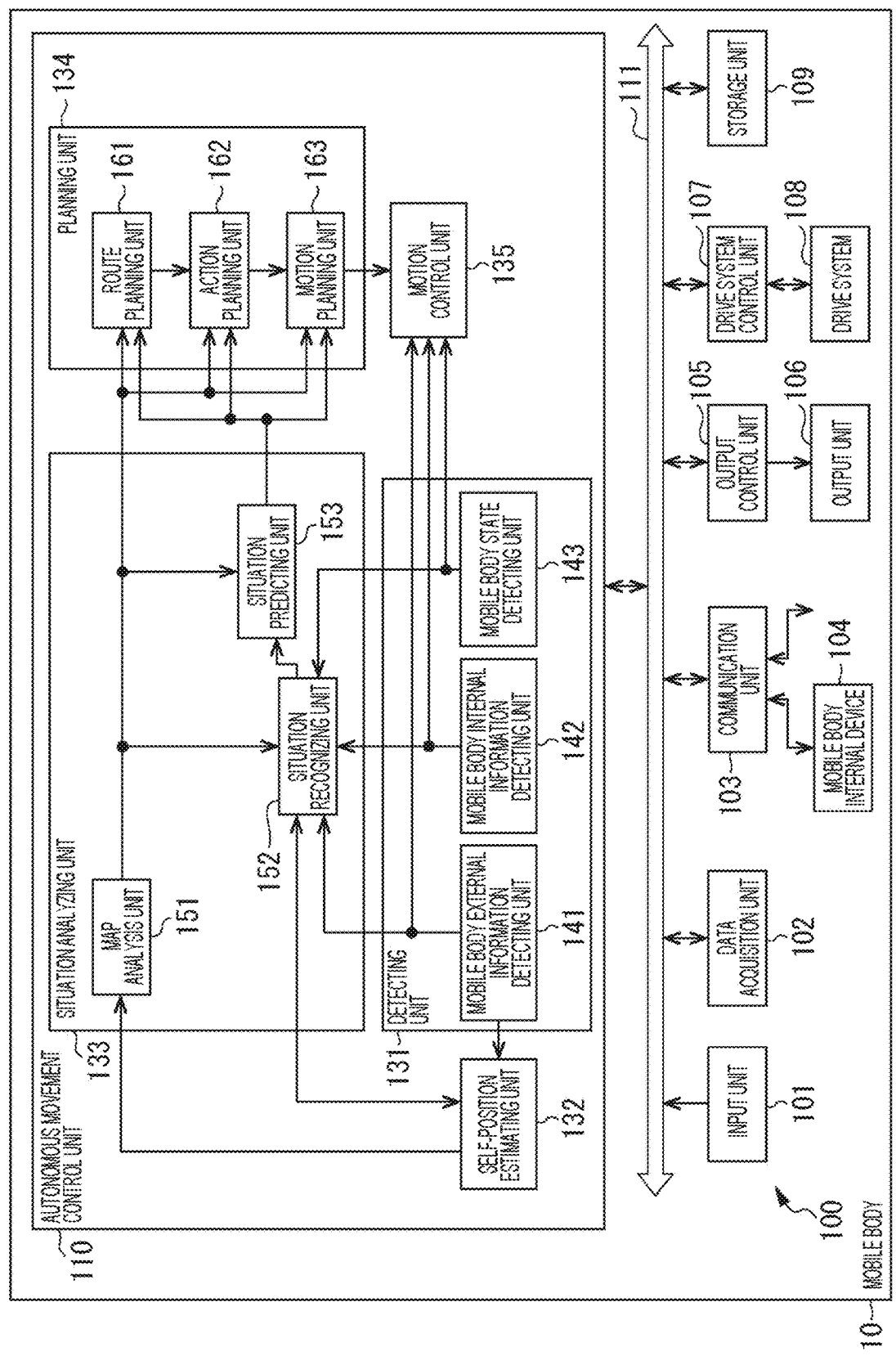
FIG. 1 is a block diagram illustrating an example configuration of a mobile body control system to which the present technology can be applied.

FIG. 1 is a block diagram illustrating an example configuration of general functions of a mobile body control system 100 to which the present technology is applied.

The mobile body control system 100 is a system disposed in a mobile body 10 to perform various types of control over the mobile body 10.

The mobile body 10 includes, for example, a mobile body that captures images of the surroundings while moving and performs processing using the captured images. Examples of the mobile body 10 include mobile bodies with passengers such as a vehicle, a motorcycle, a bicycle, a personal mobility, an airplane, a ship, a construction machine, an agricultural machine (tractor), and the like. In addition, examples of the mobile body 10 include mobile bodies without passengers such as a drone, a robot, and the like that are moved by remote operation or automatic control. Moreover, the mobile body 10 may be moved by, for example, direct operation, remote operation, or automatic control.

The mobile body control system 100 includes an input unit 101, a data acquisition unit 102, a communication unit 103, mobile body internal equipment 104, an output control unit 105, an output unit 106, a drive system control unit 107, a drive system 108, a storage unit 109, and an autonomous movement control unit 110. The input unit 101, the data acquisition unit 102, the communication unit 103, the output control unit 105, the drive system control unit 107, the storage unit 109, and the autonomous movement control unit 110 are connected to one another via a communication network 111. The communication network 111 includes, for example, a controller area network (CAN), a local interconnect network (LIN), a local area network (LAN) such as IEEE 802.3, a communication network or a bus compliant with any standard such as FlexRay (registered trademark), a proprietary communication system that is not standardized, or the like. Note that the individual units in the mobile body control system 100 may be directly connected to one another without the communication network 111.

Note that descriptions about the communication network 111 are hereinafter omitted in a case where the individual units in the mobile body control system 100 communicate with one another via the communication network 111. For example, communication between the input unit 101 and the autonomous movement control unit 110 via the communication network 111 is simply described as communication between the input unit 101 and the autonomous movement control unit 110.

The input unit 101 includes a device used by a user to input various types of data, instructions, and the like. For example, the input unit 101 includes an operation device such as a touch panel, a button, a microphone, a switch, and a lever, and an operation device that can provide inputs by a method other than manual operation such as by sound, gesture, or the like. Furthermore, the input unit 101 may be, for example, a remote control device employing infrared rays or other radio waves, or an externally connected apparatus such as a mobile apparatus or a wearable apparatus supporting operation of the mobile body control system 100. The input unit 101 generates an input signal on the basis of data, an instruction, or the like input by the user, and supplies the input signal to the individual units in the mobile body control system 100.

The data acquisition unit 102 includes various sensors or the like that acquire data to be used for processing in the mobile body control system 100 and supplies the acquired data to the individual units in the mobile body control system 100.

For example, the data acquisition unit 102 includes various sensors for detecting the state and the like of the mobile body 10. Specifically, the data acquisition unit 102 includes, for example, a gyro sensor, an acceleration sensor, and an inertial measurement unit (IMU), as well as including sensors or the like for detecting an operation amount of an accelerator or other acceleration input, an operation amount of deceleration input, an operation amount of direction instruction input, the number of rotations, input/output energy, and a fuel amount of a driving device such as an engine or a motor, a torque amount of an engine, a motor, or the like, a rotation speed or torque of a wheel or joint, or the like.

Furthermore, the data acquisition unit 102 includes, for example, various sensors for detecting information regarding the outside of the mobile body 10. Specifically, the data acquisition unit 102 includes, for example, an imaging device such as a time-of-flight (ToF) camera, a stereo camera, a monocular camera, an infrared camera, a polarized camera, and any other camera. Furthermore, the data acquisition unit 102 includes, for example, an environment sensor for detecting weather, climate, or the like, and a surrounding information detection sensor for detecting an object around the mobile body 10. The environment sensor includes, for example, a raindrop sensor, a fog sensor, a sunshine sensor, a snow sensor, and the like. The surrounding information detection sensor includes, for example, a laser ranging sensor, an ultrasonic sensor, a radar, a LiDAR (light detection and ranging, or laser imaging, detection, and ranging), a sonar, and the like.

Moreover, the data acquisition unit 102 includes, for example, various sensors for detecting the current position of the mobile body 10. Specifically, the data acquisition unit 102 includes, for example, a GNSS receiver that receives a GNSS signal from a global navigation satellite system (GNSS) satellite, and the like.

The communication unit 103 communicates with the mobile body internal equipment 104 and various apparatuses, servers, base stations, and the like outside the mobile body to transmit data supplied from the individual units in the mobile body control system 100 and supply received data to the individual units in the mobile body control system 100. Note that the communication protocol supported by the communication unit 103 is not particularly limited, and the communication unit 103 can support a plurality of types of communication protocols.

For example, the communication unit 103 wirelessly communicates with the mobile body internal equipment 104 by a wireless LAN, Bluetooth (registered trademark), near-field communication (NFC), Wireless USB (WUSB), or the like. Furthermore, for example, the communication unit 103 performs wired communication with the mobile body internal equipment 104 by Universal Serial Bus (USB), High-Definition Multimedia Interface (HDMI) (registered trademark), Mobile High-Definition Link (MHL), or the like via a connection terminal (not illustrated) (and a cable, if necessary).

Moreover, for example, the communication unit 103 communicates with an apparatus (for example, an application server or a control server) present on an external network (for example, the Internet, a cloud network, or an operator-specific network) via a base station or an access point. Furthermore, for example, the communication unit 103 communicates with a terminal present in the vicinity of the mobile body 10 (for example, a terminal of a pedestrian or store or a machine-type communication (MTC) terminal) using the peer-to-peer (P2P) technology. Moreover, for example, in a case where the mobile body 10 is a vehicle, the communication unit 103 performs V2X communication such as vehicle-to-vehicle communication, vehicle-to-infrastructure communication, vehicle-to-home (mobile body 10 to home) communication, vehicle-to-pedestrian communication, and the like. Furthermore, for example, the communication unit 103 includes a beacon receiving unit to receive radio waves or electromagnetic waves emitted from a radio station or the like installed on a road to acquire information regarding the current position, traffic congestion, roadblocks, a required time, or the like.

The mobile body internal equipment 104 includes, for example, a mobile apparatus or a wearable apparatus possessed by a user, an information apparatus carried by or attached to the mobile body 10, a navigation device that searches for a route to any destination, and the like.

The output control unit 105 controls the output of various types of information to the user or to the outside of the mobile body. For example, the output control unit 105 generates an output signal including at least either one of visual information (such as image data) or auditory information (such as audio data) and supplies the output signal to the output unit 106, thereby controlling the output of visual information and auditory information from the output unit 106. Specifically, for example, the output control unit 105 combines pieces of image data captured by different imaging devices in the data acquisition unit 102 to generate a bird's eye image, a panoramic image, or the like, and supplies an output signal including the generated image to the output unit 106. Furthermore, for example, the output control unit 105 generates sound data including a warning sound, a warning message, or the like about a hazard such as collision, contact, or entry into a danger area, and supplies an output signal including the generated sound data to the output unit 106.

The output unit 106 includes a device capable of outputting visual information or auditory information to the user or to the outside of the mobile body. For example, the output unit 106 includes a display device, an instrument panel, an audio speaker, a headphone, a wearable device such as a glasses-type display worn on the user, a projector, a lamp, and the like. The display device included in the output unit 106 may not only be a device having a general display but also be, for example, a device that displays visual information in the driver's field of view such as a head-up display, a see-through display, a device with an augmented reality (AR) display function, or the like. Note that the output control unit 105 and the output unit 106 are non-essential components for the autonomous movement processing, and thus may be omitted as necessary.

The drive system control unit 107 controls the drive system 108 by generating various control signals and supplying the control signals to the drive system 108. Furthermore, the drive system control unit 107 supplies control signals to the individual units other than the drive system 108 as necessary to make, for example, a notification of the control state of the drive system 108.

The drive system 108 includes various devices involved in the drive system of the mobile body 10. For example, the drive system 108 includes a servo motor that is disposed at each of joints in the four legs and is capable of accepting specified angle and torque, a motion controller that decomposes the motion of movement of the robot itself and replaces the motion with motions of the four legs, and a feedback control device supported by sensors in each motor and sensors on the soles of the feet.

In another example, the drive system 108 includes motors with four to six airframe upward propellers and a motion controller that decomposes the motion of movement of the robot itself and replaces the motion with the rotation amount of each motor.

In still another example, the drive system 108 includes a driving force generation device for generating a driving force for an internal combustion engine, a driving motor, or the like, a driving force transmission mechanism for transmitting a driving force to a wheel, a steering mechanism for adjusting a steering angle, a braking device for generating a braking force, an antilock brake system (ABS), electronic stability control (ESC), an electric power steering device, and the like.

The storage unit 109 includes, for example, a read only memory (ROM), a random access memory (RAM), a magnetic storage device such as a hard disc drive (HDD), a semiconductor storage device, an optical storage device, a magneto-optical storage device, and the like. The storage unit 109 stores various programs, data, and the like used by the individual units in the mobile body control system 100. For example, the storage unit 109 stores map data including three-dimensional high-precision maps such as dynamic maps, global maps covering a broader area with lower precision than high-precision maps, local maps including information regarding surroundings of the mobile body 10, and the like.

The autonomous movement control unit 110 performs control related to autonomous movement such as automated driving, driving assistance, or the like. Specifically, the autonomous movement control unit 110 performs, for example, coordinated control for the purpose of achieving functions of avoiding collision of, or mitigating impact on, the mobile body 10, following movement based on the distance between mobile bodies, moving the mobile body at constant speed, or warning of collision of the mobile body 10. Furthermore, the autonomous movement control unit 110 performs, for example, coordinated control for the purpose of autonomous movement and the like for autonomously moving without relying on user operations. The autonomous movement control unit 110 includes a detecting unit 131, a self-position estimating unit 132, a situation analyzing unit 133, a planning unit 134, and a motion control unit 135.

The detecting unit 131 detects various types of information necessary for controlling the autonomous movement. The detecting unit 131 includes a mobile body external information detecting unit 141, a mobile body internal information detecting unit 142, and a mobile body state detecting unit 143.

The mobile body external information detecting unit 141 performs a process of detecting information regarding the outside of the mobile body 10 on the basis of data or signals from the individual units in the mobile body control system 100. For example, the mobile body external information detecting unit 141 performs processes of detecting, recognizing, and tracking an object around the mobile body 10 and a process of detecting the distance to the object. Objects to be detected include, for example, another mobile body, a person, an obstacle, a structure, a road, a traffic signal, a traffic sign, a road marking, and the like. Furthermore, the mobile body external information detecting unit 141 performs, for example, a process of detecting the ambient environment around the mobile body 10. The ambient environment to be detected includes, for example, weather, temperature, humidity, brightness, road surface condition, and the like. The mobile body external information detecting unit 141 supplies data indicating results of the detection process to the self-position estimating unit 132, a map analysis unit 151 and a situation recognizing unit 152 in the situation analyzing unit 133, and to the motion control unit 135 and the like.

The mobile body internal information detecting unit 142 performs a process of detecting information regarding the inside of the mobile body on the basis of data or signals from the individual units in the mobile body control system 100. For example, the mobile body internal information detecting unit 142 performs processes of authenticating and recognizing the driver, detecting the state of the driver, detecting a passenger, detecting the internal environment in the mobile body, and the like. The state of the driver to be detected includes, for example, physical condition, wakeful level, concentration level, fatigue level, line-of-sight direction, and the like. The mobile body internal environment to be detected includes, for example, temperature, humidity, brightness, smell, and the like. The mobile body internal information detecting unit 142 supplies data indicating results of the detection process to the situation recognizing unit 152 in the situation analyzing unit 133 and to the motion control unit 135 and the like.

The mobile body state detecting unit 143 performs a process of detecting the state of the mobile body 10 on the basis of data or signals from the individual units in the mobile body control system 100. The state of the mobile body 10 to be detected includes, for example, velocity, acceleration, angular velocity, steering angle, presence or absence of abnormality and details of the abnormality, the state of driving operation, position and tilt of power seat, door locked or unlocked, states of other devices installed in the mobile body, and the like. The mobile body state detecting unit 143 supplies data indicating results of the detection process to the situation recognizing unit 152 in the situation analyzing unit 133 and to the motion control unit 135 and the like.

The self-position estimating unit 132 performs a process of estimating the position, the posture, and the like of the mobile body 10 on the basis of data or signals from the individual units in the mobile body control system 100 including the mobile body external information detecting unit 141 and the situation recognizing unit 152 in the situation analyzing unit 133, and the like. Furthermore, the self-position estimating unit 132 generates, if necessary, a local map used for estimating the self-position (hereinafter referred to as a map for self-position estimation). The map for self-position estimation may be, for example, a high-precision map employing a technology such as simultaneous localization and mapping (SLAM). The self-position estimating unit 132 supplies data indicating results of the estimation process to the map analysis unit 151 in the situation analyzing unit 133 and to the situation recognizing unit 152 and the like. Furthermore, the self-position estimating unit 132 causes the storage unit 109 to store the map for self-position estimation.

The situation analyzing unit 133 performs a process of analyzing the situations of the mobile body 10 and its surroundings. The situation analyzing unit 133 includes the map analysis unit 151, the situation recognizing unit 152, and a situation predicting unit 153.

The map analysis unit 151 performs a process of analyzing various maps stored in the storage unit 109 while using, if necessary, data or signals from the individual units in the mobile body control system 100 including the self-position estimating unit 132, the mobile body external information detecting unit 141, and the like to construct a map that includes information necessary for the autonomous movement processing. The map analysis unit 151 supplies the constructed map to the situation recognizing unit 152 and the situation predicting unit 153, and to a route planning unit 161, an action planning unit 162, and a motion planning unit 163 in the planning unit 134, and the like.

The situation recognizing unit 152 performs a process of recognizing situations of and around the mobile body 10 on the basis of data or signals from the individual units in the mobile body control system 100 including the self-position estimating unit 132, the mobile body external information detecting unit 141, the mobile body internal information detecting unit 142, the mobile body state detecting unit 143, the map analysis unit 151, and the like. For example, the situation recognizing unit 152 performs processes of recognizing the situation of the mobile body 10, the situation around the mobile body 10, the situation of the driver of the mobile body 10, and the like. Furthermore, the situation recognizing unit 152 generates, if necessary, a local map used for recognizing situations around the mobile body 10 (hereinafter referred to as a map for situation recognition). The map for situation recognition may be, for example, an occupancy grid map, a lane map, or a point cloud map.

The situation of the mobile body 10 to be recognized includes, for example, the position, posture, movement (for example, velocity, acceleration, moving direction, and the like) of the mobile body 10, and presence or absence of abnormality, details of the abnormality, and the like. The situation around the mobile body 10 to be recognized includes, for example, the type and position of a stationary object therearound, the type, position, and movement of a moving object therearound (for example, velocity, acceleration, moving direction, and the like), the arrangement of roads therearound and road surface conditions, and the ambient weather, temperature, humidity, brightness, and the like. The state of the driver to be recognized includes, for example, physical condition, wakeful level, concentration level, fatigue level, changes in line-of-sight, driving operation, and the like.

The situation recognizing unit 152 supplies data indicating the result of the recognition process (including the map for situation recognition, if necessary) to the self-position estimating unit 132, the situation predicting unit 153, and the like. Furthermore, the situation recognizing unit 152 causes the storage unit 109 to store the map for situation recognition.

The situation predicting unit 153 performs a process of predicting the situations of and around the mobile body 10 on the basis of data and signals from the individual units in the mobile body control system 100 including the map analysis unit 151, the situation recognizing unit 152, and the like. For example, the situation predicting unit 153 performs processes of predicting the situation of the mobile body 10, the situation around the mobile body 10, the situation of the driver, and the like.

The situation of the mobile body 10 to be predicted includes, for example, the behavior of the mobile body 10, any occurrence of abnormality, a possible travel distance, and the like. The situation around the mobile body 10 to be predicted includes, for example, the behavior of a moving object around the mobile body 10, a change in the state of a signal, a change in the environment such as weather, and the like. The situation of the driver to be predicted includes, for example, the behavior, physical condition, and the like of the driver.

The situation predicting unit 153 supplies data indicating the result of the prediction process along with data from the situation recognizing unit 152 to the route planning unit 161, the action planning unit 162, and the motion planning unit 163 in the planning unit 134, and the like.

The route planning unit 161 plans a route to the destination on the basis of data or signals from the individual units in the mobile body control system 100 including the map analysis unit 151, the situation predicting unit 153, and the like. For example, the route planning unit 161 sets a route from the current position to the specified destination on the basis of the global map. Furthermore, for example, the route planning unit 161 changes the route, as appropriate, on the basis of the conditions including traffic congestion, traffic accident, roadblocks, construction work, the driver's physical condition, and the like. The route planning unit 161 supplies data indicating the planned route to the action planning unit 162 and the like.

The action planning unit 162 plans an action of the mobile body 10 for safely moving along the route planned by the route planning unit 161 within a planned time on the basis of data or signals from the individual units in the mobile body control system 100 including the map analysis unit 151, the situation predicting unit 153, and the like. For example, the action planning unit 162 creates plans including start, stop, traveling direction (for example, moving forward, moving backward, turning left, turning right, turning in some other direction, and the like), moving speed, overtaking, and the like. The action planning unit 162 supplies data indicating the planned action of the mobile body 10 to the motion planning unit 163 and the like.

The motion planning unit 163 plans motions of the mobile body 10 for achieving the action planned by the action planning unit 162 on the basis of data or signals from the individual units in the mobile body control system 100 including the map analysis unit 151, the situation predicting unit 153, and the like. For example, the motion planning unit 163 plans acceleration, deceleration, movement tracks, and the like. The motion planning unit 163 supplies data indicating the planned motions of the mobile body 10 to the motion control unit 135 and the like.

The motion control unit 135 controls motions of the mobile body 10.

More specifically, the motion control unit 135 performs a process of detecting an emergency such as collision, contact, entry into a danger area, abnormality of the driver, abnormality of the mobile body 10, and the like on the basis of the result of detection by the mobile body external information detecting unit 141, the mobile body internal information detecting unit 142, and the mobile body state detecting unit 143. Upon detection of the occurrence of an emergency, the motion control unit 135 plans a motion of the mobile body 10 for avoiding the emergency such as quick stop, quick turning, or the like.

Furthermore, the motion control unit 135 performs acceleration and deceleration control so that the mobile body 10 can achieve the motion planned by the motion planning unit 163. For example, the motion control unit 135 calculates a control target value for a driving force generating device or a braking device to achieve the planned acceleration, deceleration, or quick stop, and supplies a control command indicating the calculated control target value to the drive system control unit 107.

Moreover, the motion control unit 135 performs directional control so that the mobile body 10 can achieve the motion planned by the motion planning unit 163. For example, the motion control unit 135 calculates a control target value for a steering mechanism to achieve the movement track or quick turn planned by the motion planning unit 163 and supplies a control command indicating the calculated control target value to the drive system control unit 107.

Note that descriptions are provided below with examples in which the mobile body 10 is a vehicle in most cases.

2. First Embodiment

A first embodiment of the present technology will now be described with reference to FIGS. 2 to 11.

Note that the first embodiment mainly relates to processing by the data acquisition unit 102 in the mobile body control system 100 in FIG. 1.

<Example Configuration of Imaging System>

Figure 2:
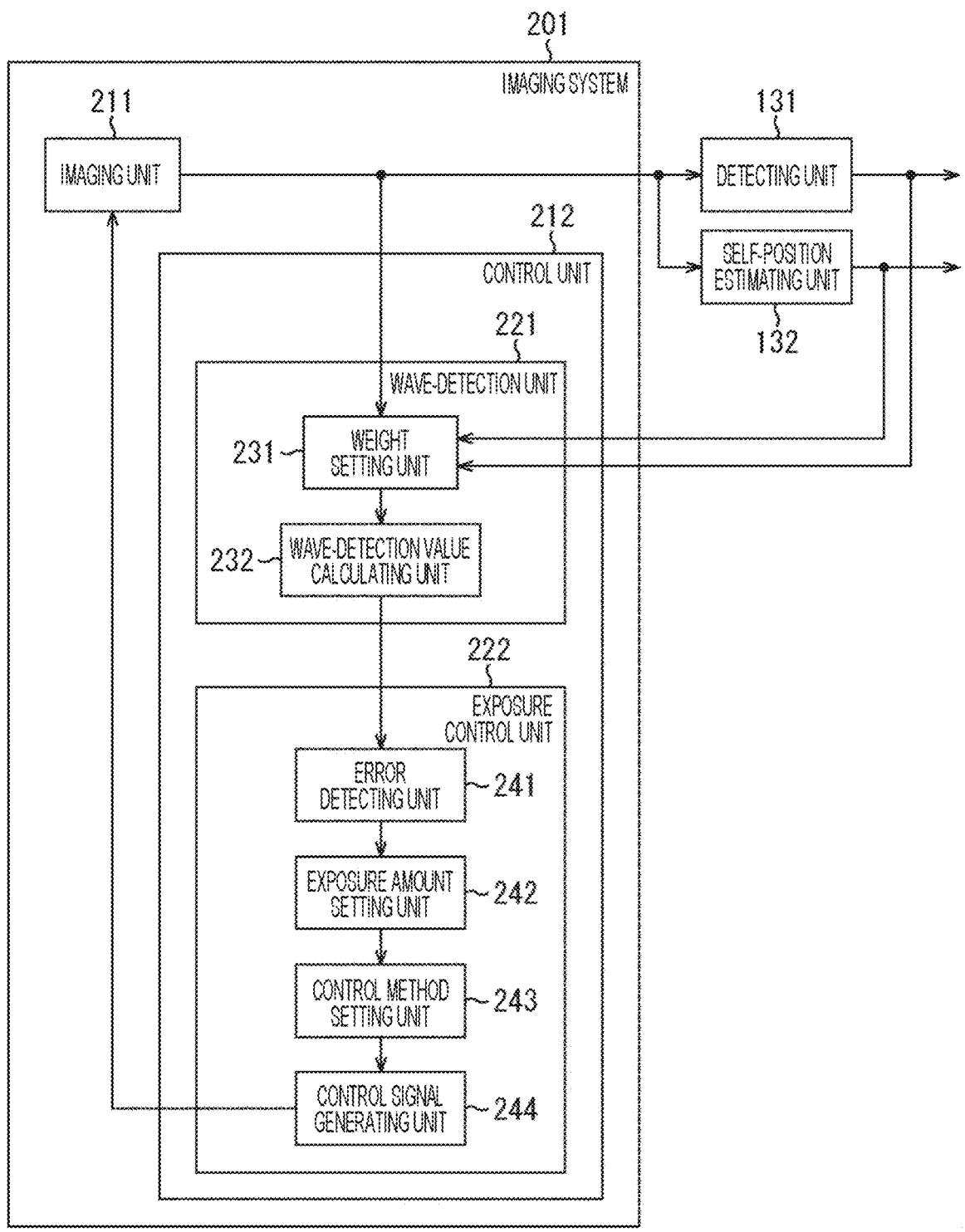
FIG. 2 is a block diagram illustrating a first embodiment of an imaging system to which the present technology is applied.

FIG. 2 is a block diagram illustrating an example configuration of an imaging system 201, which represents the first embodiment of the present technology.

The imaging system 201 is a system that takes images of surroundings of the mobile body 10. The imaging system 201 includes an imaging unit 211 and a control unit 212.

Note that the imaging system 201 may include a single device (an imaging device, for example) or include a plurality of devices. In the latter case, for example, the imaging unit 211 and the control unit 212 may be respectively included in different devices (for example, an imaging device and an exposure control device), or the imaging unit 211 and part of the control unit 212 may be included in one device (for example, an imaging device) and the rest of the control unit 212 may be included in a different device (for example, an exposure control device).

The imaging unit 211 takes images of surroundings of the mobile body 10. The imaging unit 211 supplies an image obtained as a result of the imaging (hereinafter referred to as a captured image) to the detecting unit 131 and the self-position estimating unit 132 in the mobile body control system 100 and to a weight setting unit 231 in a wave-detection unit 221 in the control unit 212 and the like.

Furthermore, the imaging unit 211 adjusts the amount of exposure by adjusting the exposure time (shutter speed) of an imaging element (not illustrated), the gain (sensitivity) of the imaging element, and the aperture size on the basis of a control signal from a control signal generating unit 244.

The control unit 212 performs exposure control and the like of the imaging unit 211. The control unit 212 includes the wave-detection unit 221 and an exposure control unit 222.

The wave-detection unit 221 detects a wave-detection value based on brightness levels of a captured image and supplies a wave-detection signal indicating the wave-detection value to an error detecting unit 241 in the exposure control unit 222. The wave-detection unit 221 includes the weight setting unit 231 and a wave-detection value calculating unit 232.

As described later, the weight setting unit 231 divides a captured image into a plurality of divided areas and assigns a weight to each divided area. The weight setting unit 231 supplies the captured image and data indicating the weights of the individual divided areas to the wave-detection value calculating unit 232.

The wave-detection value calculating unit 232 calculates a wave-detection value on the basis of the brightness levels and weights of the individual divided areas in the captured image. The wave-detection value calculating unit 232 supplies a wave-detection signal indicating the wave-detection value to the error detecting unit 241 in the exposure control unit 222.

The exposure control unit 222 performs exposure control of the imaging unit 211 on the basis of the wave-detection signal. The exposure control unit 222 includes the error detecting unit 241, an exposure amount setting unit 242, a control method setting unit 243, and the control signal generating unit 244.

The error detecting unit 241 detects an error of the wave-detection value detected by the wave-detection unit 221 with respect to a target value and supplies data indicating the detected error to the exposure amount setting unit 242.

The exposure amount setting unit 242 sets a target value of exposure amount for the imaging unit 211 on the basis of the error in the wave-detection value. The exposure amount setting unit 242 supplies data indicating the target value of the exposure amount to the control method setting unit 243.

The control method setting unit 243 sets a method for controlling the exposure in the imaging unit 211 so that the exposure amount in the imaging unit 211 reaches the target value. The control method setting unit 243 supplies the target value of exposure amount and data indicating the method for controlling the exposure to the control signal generating unit 244.

The control signal generating unit 244 generates a control signal for controlling the exposure in the imaging unit 211 in accordance with the designated method for controlling the exposure so that the exposure amount reaches the target value, and supplies the generated control signal to the imaging unit 211.

<Exposure Control Process>

Figure 3:
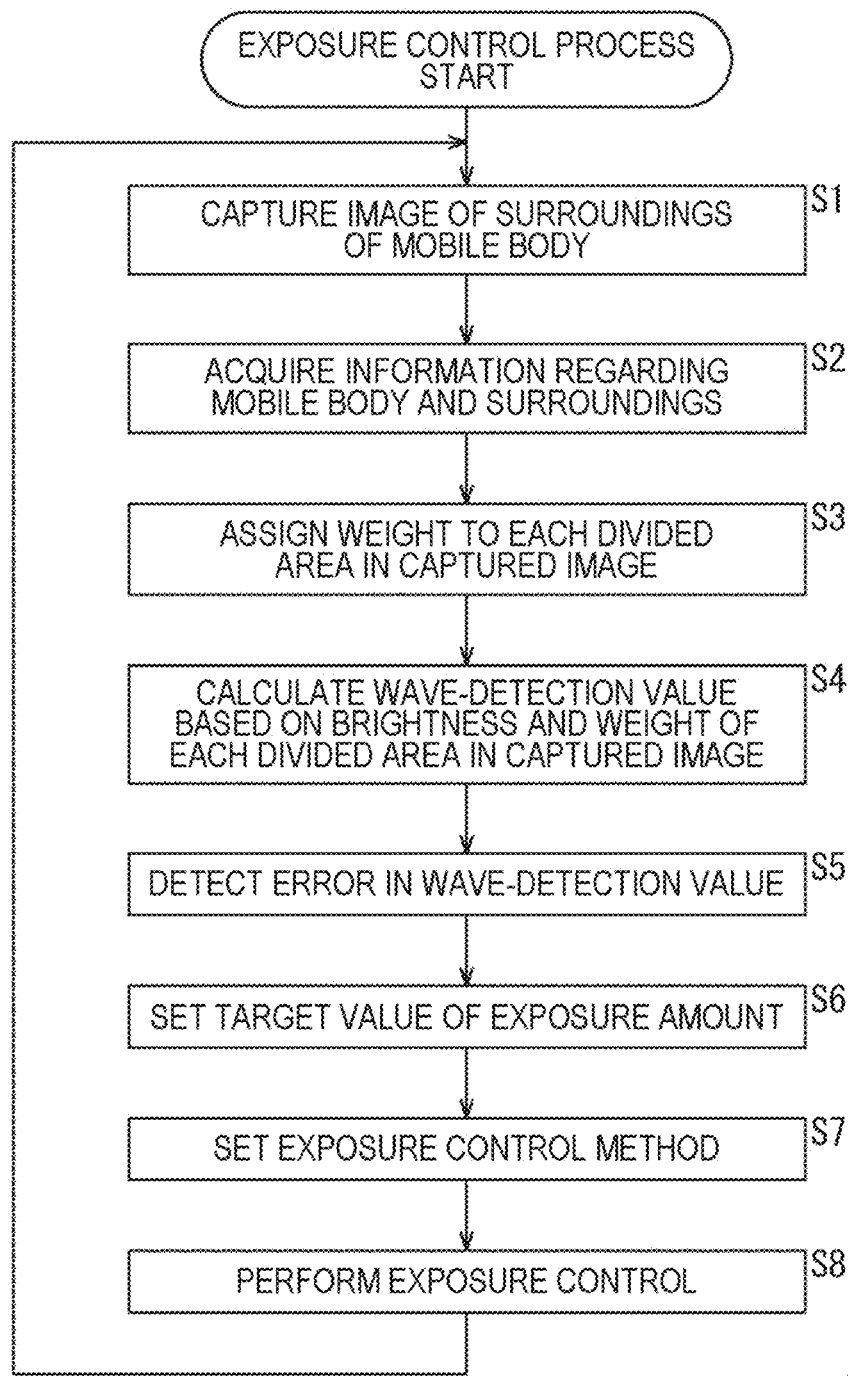
FIG. 3 is a flowchart for explaining an exposure control process performed by the imaging system in FIG. 2.

Referring to the flowchart in FIG. 3, the following describes an exposure control process performed by the imaging system 201.

For example, the process is started when the imaging system 201 is powered on and is exited when the imaging system 201 is powered off.

In step S1, the imaging unit 211 takes images of surroundings of the mobile body 10. The imaging unit 211 supplies the captured image obtained by the imaging to the detecting unit 131, the self-position estimating unit 132, the weight setting unit 231, and the like.

The mobile body external information detecting unit 141 in the detecting unit 131 (FIG. 1) detects, for example, feature points in the captured image and the position (distance and direction) of each feature point with respect to the mobile body 10. Note that any method can be used for detecting a feature point.

Furthermore, the mobile body external information detecting unit 141 detects, for example, the position, type, and the like of each subject in the captured image. Note that any method can be used for detecting a subject such as, for example, semantic segmentation, human body detection, vehicle detection, or the like.

Moreover, the mobile body external information detecting unit 141 detects, for example, the movement (for example, velocity, moving direction, and the like) of each subject in the captured image. Note that any method can be used for detecting the movement of a subject.

The self-position estimating unit 132 estimates the self-position of the mobile body 10 on the basis of the captured image and others.

Figure 4:
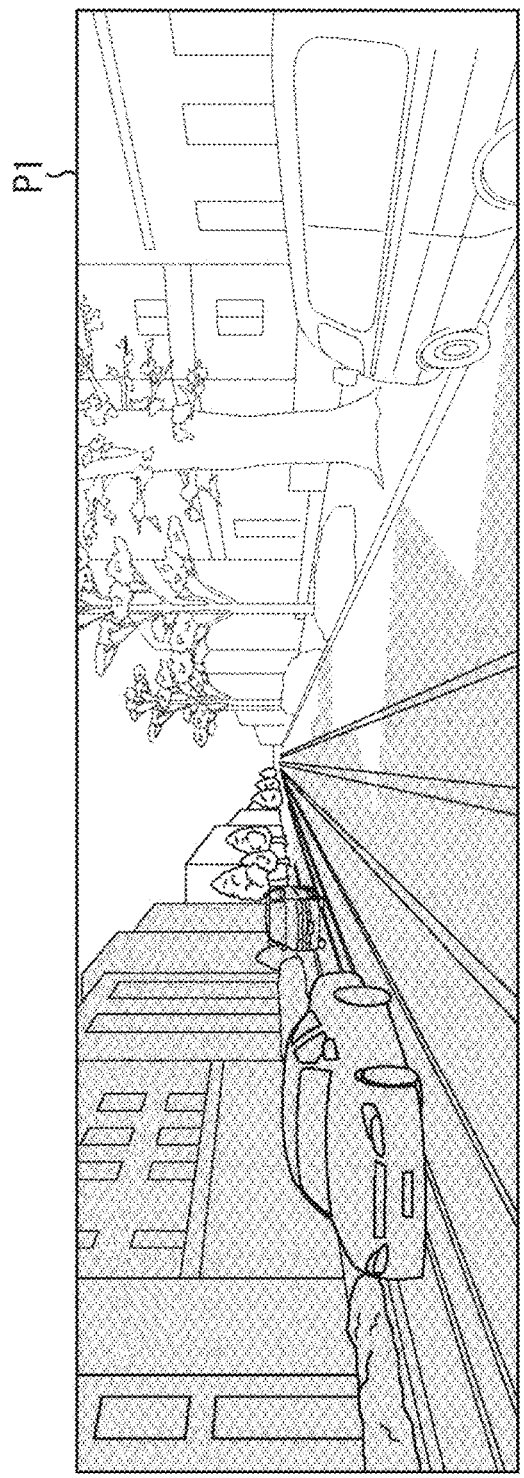
FIG. 4 is a schematic diagram showing an example of a captured image.

Note that the following describes a case where the image that has been taken is a captured image P1 schematically shown in FIG. 4, with specific examples provided as appropriate. The captured image P1 is an image captured in front of the mobile body 10, showing the sky, a road surface ahead, other vehicles on the road, and buildings, trees, and the like on both sides of the road.

In step S2, the weight setting unit 231 acquires information regarding the mobile body 10 and its surroundings.

For example, the weight setting unit 231 acquires, from the mobile body external information detecting unit 141, data indicating detection results including feature points in the captured image, the position (distance and direction) of each feature point with respect to the mobile body 10, and the position, type, movement, and the like of each subject in the captured image.

Furthermore, for example, the weight setting unit 231 acquires, from the mobile body state detecting unit 143 in the detecting unit 131 (FIG. 1), data indicating detection results including the velocity, angular velocity, and the like of the mobile body 10.

Moreover, for example, the weight setting unit 231 acquires, from the self-position estimating unit 132, data indicating the result of estimating the self-position of the mobile body 10.

In step S3, the weight setting unit 231 assigns a weight to each divided area in the captured image. Specifically, the weight setting unit 231 divides the captured image into a plurality of divided areas. Then, the weight setting unit 231 assigns a weight to each divided area as described later in detail. The weight setting unit 231 supplies the captured image and data indicating the weights of the individual divided areas to the wave-detection value calculating unit 232.

In step S4, the wave-detection value calculating unit 232 calculates a wave-detection value on the basis of the brightness levels and weights of the individual divided areas in the captured image. The wave-detection value calculating unit 232 supplies a wave-detection signal indicating the wave-detection value to the error detecting unit 241.

Here, a specific example of a method for calculating the wave-detection value in step S3 and step S4 is described with reference to FIGS. 5 to 11.

<First Method for Calculating Wave-Detection Value>

First, the following describes a first method for calculating the wave-detection value with reference to FIGS. 5 to 9.

Figure 5:
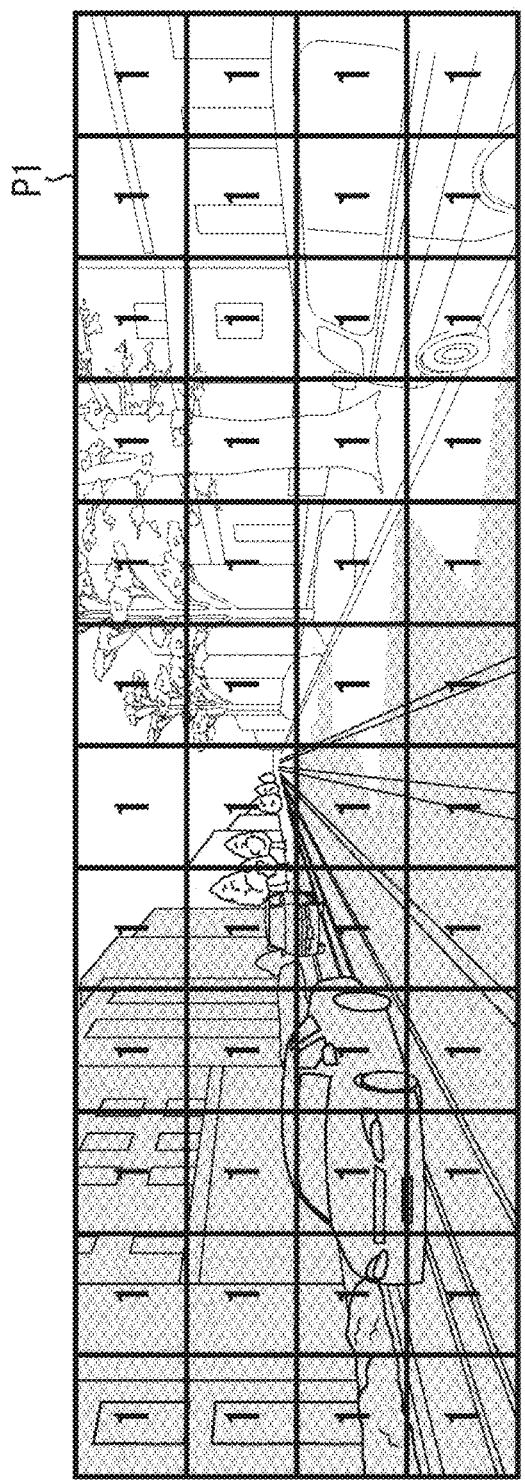
FIG. 5 is a diagram illustrating a first example of weights assigned to divided areas.

For example, as illustrated in FIG. 5, the weight setting unit 231 divides the captured image P1 into n (48 in this example) rectangular divided areas i (i=1 to n) having the same size, and assigns a weight wi to each divided area i. The number in each divided area i in FIG. 5 indicates the weight wi of the divided area i. In this example, the weight wi of every divided area is set to 1.

The wave-detection value calculating unit 232 calculates, as the wave-detection value, the weighted average of brightness levels of the individual divided areas i in accordance with the following equation (1).

[Mathematical 1]

$$\text{wave-detection value} = \frac{\sum_{i=1}^{n} w_i * x_i}{\sum_{i=1}^{n} w_i} \quad (1)$$

Note that xi represents the average xi of brightness levels of individual pixels in the divided area i (hereinafter referred to as average brightness xi).

Here, the example in FIG. 5 shows that the weight wi of every divided area i is set to 1. Then, substituting 1 into the weight wi in the equation (1) gives the following equation (2).

[Mathematical 2]

$$\text{wave-detection value} = \frac{\sum_{i=1}^{n} x_i}{n} \quad (2)$$

That is, if the weight wi of every divided area i is set to 1, the wave-detection value is equal to the average of the average brightness levels xi of individual divided areas i. In other words, the wave-detection value is equal to the simple average of brightness levels of individual pixels in the captured image P1.

However, if the wave-detection value is set to the simple average of brightness levels of individual pixels in a captured image, the exposure in the imaging unit 211 may not always be controlled appropriately in a case where the brightness around the mobile body 10 abruptly changes. That is, since exposure control is usually performed on the basis of a wave-detection value based on the captured image taken earlier by a predetermined number of frames or by a predetermined time, the exposure control may fail to quickly follow the change in ambient brightness when the ambient brightness abruptly changes.

For example, at the time of moving from a dark place to a bright place near the exit or the like of a tunnel or a forest, the exposure control may fail to be performed in time, causing a captured image to have blown-out highlights in bright areas.

Figure 6:
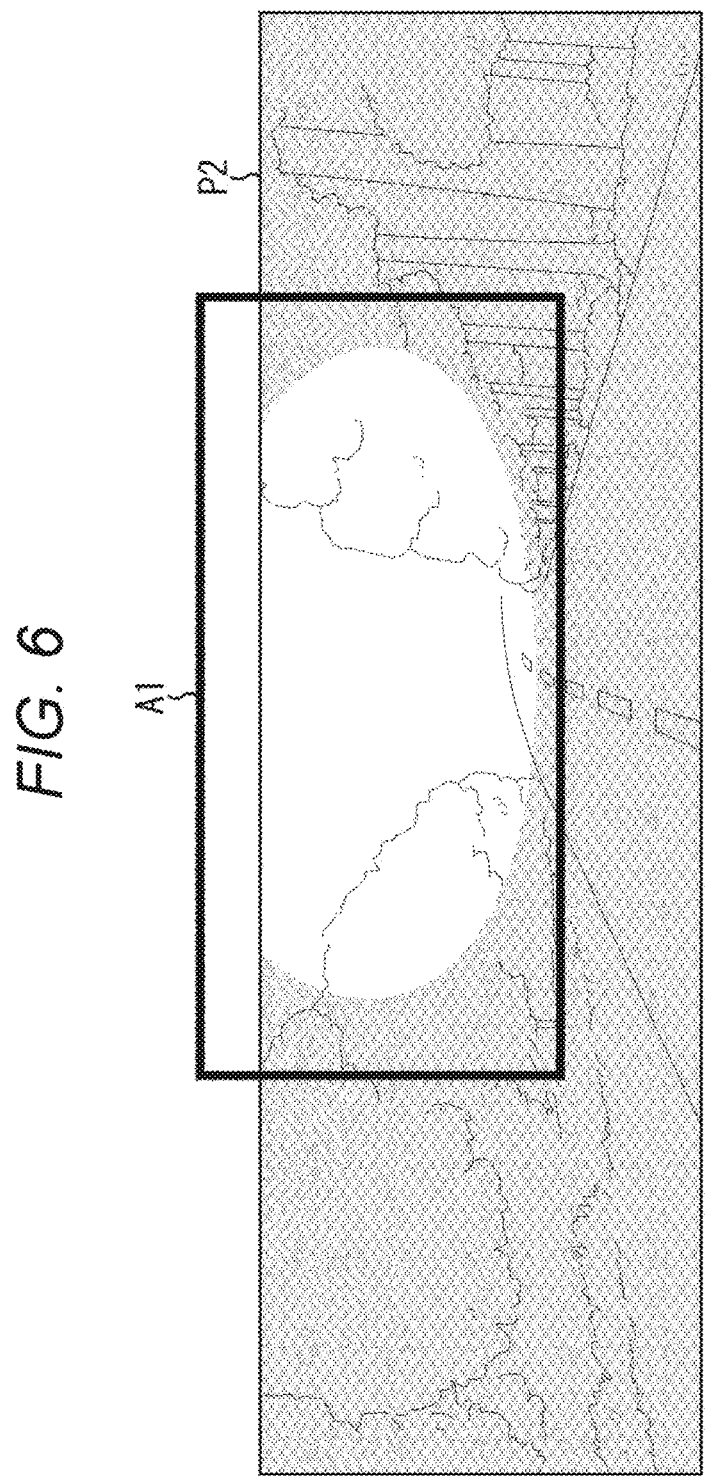
FIG. 6 is a schematic diagram of an example of a captured image including blown-out highlights.

For example, FIG. 6 schematically shows a captured image P2 taken near the exit of a forest. For example, an area A1 in the captured image P2 is caused to have blown-out highlights near the exit of the forest and in a bright area ahead of the exit. Therefore, the situation outside the forest cannot be accurately recognized, which may decrease the accuracy of the self-position estimation, obstacles recognition, and the like.

Furthermore, for example, at the time of moving from a bright place to a dark place near the entrance or the like of a tunnel or a forest, the exposure control may fail to be performed in time, causing a captured image to have blocked-up shadows in dark areas.

Figure 7:
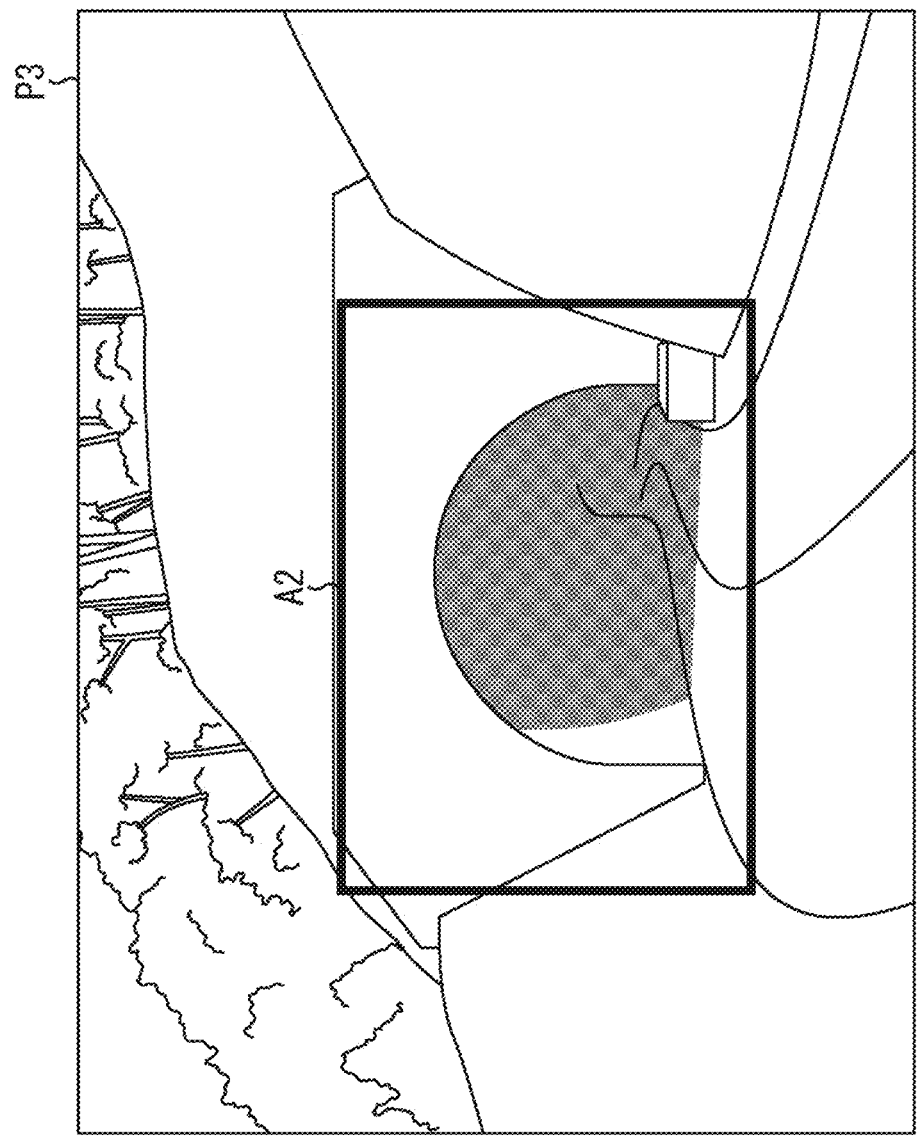
FIG. 7 is a schematic diagram of an example of a captured image including blocked-up shadows.

For example, FIG. 7 schematically shows a captured image P3 taken near the entrance of a tunnel. For example, an area A2 in the captured image P3 is caused to have blocked-up shadows in a dark area inside the tunnel. Therefore, the situation inside the tunnel cannot be accurately recognized, which may cause troubles with the self-position estimation, obstacles recognition, and the like.

To address this problem, first, the weight setting unit 231 predicts a lifetime ti of each divided area i.

The lifetime ti refers to a period of time during which a divided area i (a subject in the divided area) continues to be shown in the captured image on and after a reference time serving as a basis for predicting the lifetime. In other words, the lifetime ti refers to a period of time during which a divided area i (a subject in the divided area) remains within the angle of view of the imaging unit 211 on and after the reference time. More specifically, the lifetime refers to, for example, a period of time from the time point (reference time) at which the prediction of the lifetime starts to the time point at which a divided area i (a subject in the divided area) goes out of the angle of view of the imaging unit 211 and no longer appears in the captured image.

For example, the weight setting unit 231 sets a representative feature point pi in each divided area i in a captured image.

In this process, in a case where a divided area i has only one feature point, the weight setting unit 231 identifies the feature point as the representative feature point pi.

On the other hand, in a case where a plurality of feature points is present in a divided area i, the weight setting unit 231 identifies one of the feature points as the representative feature point pi. For example, the weight setting unit 231 selects the subject having the largest area in the divided area i or the most important subject in the divided area i. Here, the most important subject refers to a subject that most highly needs to be recognized, such as a person, a vehicle, a sign, or the like. Then, as the representative feature point pi, the weight setting unit 231 identifies, for example, the feature point having the largest feature amount among the feature points of the selected subject.

Alternatively, for example, the weight setting unit 231 identifies, as the representative feature point pi, the feature point having the largest feature amount in the divided area i or the feature point closest to the center of the divided area i without regard to subjects.

Then, the weight setting unit 231 predicts the lifetime ti of the divided area i on the basis of, for example, the velocity and moving direction of the mobile body 10 and the distance and direction of the representative feature point pi from the mobile body 10. For example, assuming that the mobile body 10 continues to move at the current velocity in the current moving direction, the weight setting unit 231 predicts the time when the representative feature point pi goes out of the captured image (the time when the representative feature point goes out of the angle of view of the imaging unit 211). The weight setting unit 231 identifies the time period from the current time to the predicted time as the lifetime ti of the divided area i.

Figure 8:
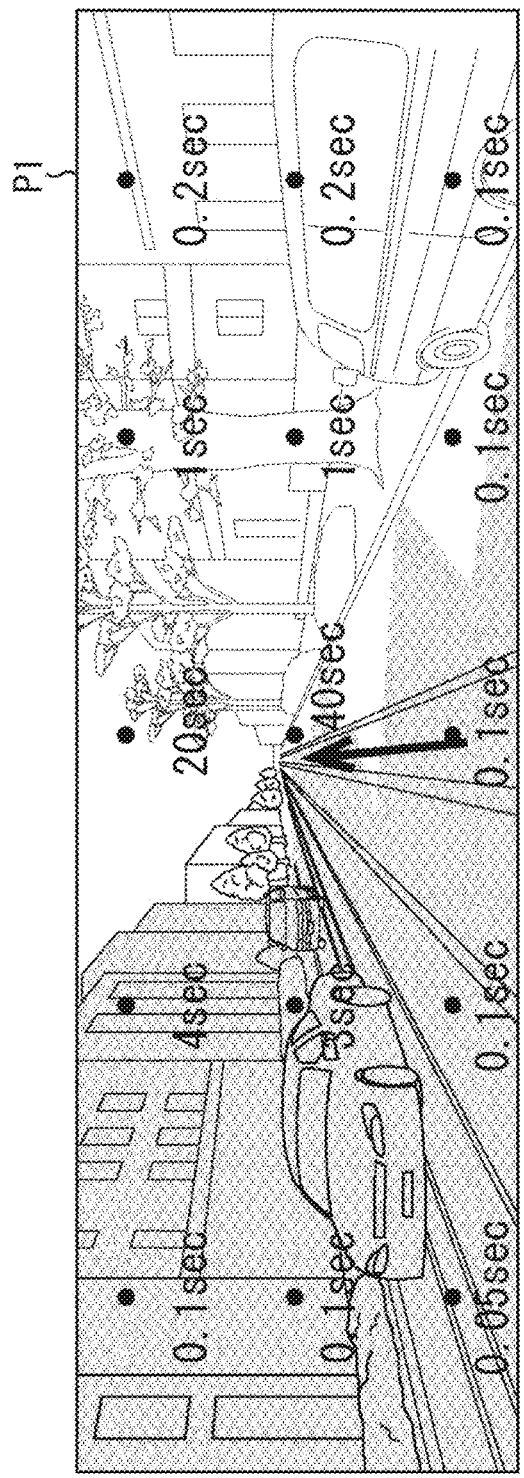
FIG. 8 is a diagram illustrating an example of lifetime.

FIG. 8 shows examples of the lifetime of each point in the captured image P1 in a case where the mobile body 10 is moving in the arrow direction. The numerical value below each black dot in the figure indicates the lifetime of each point.

In the example, a point on a subject closer to the mobile body 10 with respect to the travel direction of the mobile body 10 has a shorter lifetime. In contrast, a point on a subject farther away from the mobile body 10 with respect to the travel direction of the mobile body 10 has a longer lifetime.

Note that the weight setting unit 231 may predict the lifetime ti by further taking into consideration the movement of a subject in the divided area i.

For example, the weight setting unit 231 predicts the lifetime ti on the basis of the velocity and moving direction of the mobile body 10, the velocity and moving direction of the feature point of the subject having the representative feature point pi (hereinafter referred to as a representative subject), and the distance and direction of the representative feature point pi from the mobile body 10. For example, assuming that the mobile body 10 and the representative subject continue to move at the current velocity in the current moving direction, the weight setting unit 231 predicts the time when the representative feature point pi goes out of the captured image (the time when the representative feature point goes out of the angle of view of the imaging unit 211). The weight setting unit 231 identifies the time period from the current time to the predicted time as the lifetime ti of the divided area i.

Next, the weight setting unit 231 calculates the weight wi of each divided area i on the basis of the lifetime ti by using, for example, the function f of the following equation (3).

$$wi = f(l, D, ti, v, \omega) \quad (3)$$

Note that l represents a time lag, D represents an exposure depth, v represents a velocity of the mobile body 10, and ω represents an angular velocity of the mobile body 10.

The time lag l indicates the time required for exposure control. For example, the time lag l indicates a time period (time lag) from the acquisition of a captured image to the completion of exposure control based on the captured image. The time lag l can be described as, for example, a time period required for the exposure to be reflected.

Note that the time lag l may be a fixed value or a variable value. In the case of a variable value, the time lag l is set on the basis of, for example, the amount of change in the wave-detection value. In the case of a larger amount of change in the wave-detection value, that is, when the brightness around the mobile body 10 changes to a greater extent, the time lag l is set to a larger value because the exposure control usually takes a longer time. In the case of a smaller amount of change in the wave-detection value, that is, when the brightness around the mobile body 10 remains almost unchanged, the time lag l is set to a smaller value because the exposure control usually takes a shorter time.

The exposure depth D indicates the depth of the desired exposure, that is, the distance from the mobile body 10 to the position for which the exposure is to be adjusted.

Then, for example, by the function f, the weight wi is set to a greater value for a divided area i that becomes dominant in the captured image after the time lag l has passed (at the time when the exposure control is completed), the divided area i being of higher importance. On the other hand, for example, the weight wi is set to a smaller value for a divided area i that becomes non-dominant in the captured image after the time lag l has passed, the divided area i being of lower importance.

Here, the divided area i that becomes dominant in the captured image after the time lag l has passed refers to, for example, a divided area i that is predicted to occupy a larger area in the captured image taken after the time lag l has passed. The area occupied by a divided area i in the captured image taken after the time lag l has passed is predicted on the basis of, for example, the lifetime ti of the divided area i and the velocity v, the angular velocity w, and the like of the mobile body 10.

Furthermore, the importance of a divided area i is predicted on the basis of, for example, the time lag l, the exposure depth D, the lifetime ti, and the velocity v and the angular velocity w of the mobile body 10. For example, a divided area i is predicted to be of higher importance as the difference between the predicted distance from the mobile body 10 to the divided area i (a subject in the divided area) subsequent to the elapse of the time lag l and the exposure depth D is smaller, that is, as the divided area i (a subject in the divided area) is closer to the position for which the exposure is to be adjusted after the time lag l has passed. In contrast, for example, a divided area i is predicted to be of lower importance as the difference between the predicted distance from the mobile body 10 to the divided area i (a subject in the divided area) subsequent to the elapse of the time lag l and the exposure depth D is larger, that is, as the divided area i (a subject in the divided area) is farther away from the position for which the exposure is to be adjusted after the time lag l has passed.

Figure 9:
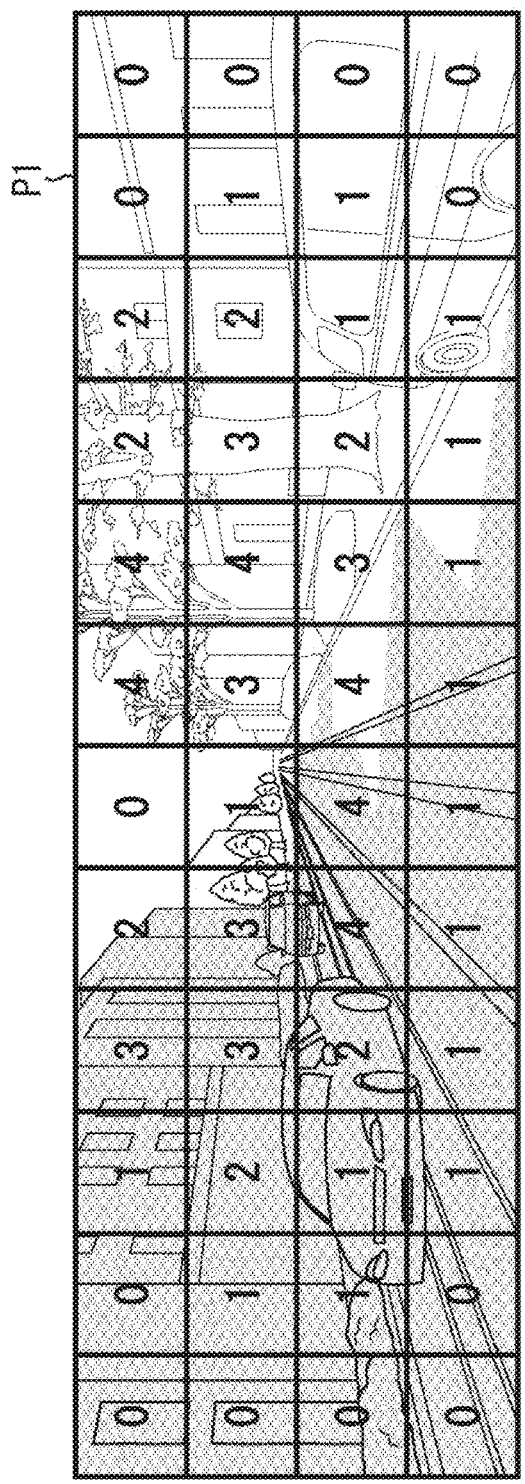
FIG. 9 is a diagram illustrating a second example of weights assigned to divided areas.

FIG. 9 shows, in a similar manner to FIG. 5, examples of the weight wi assigned to each divided area i in the captured image P1 by using the function f.

For example, a greater weight wi is assigned to a divided area i that is located near the center of the captured image P1 and that has the lifetime ti being closer to (time lag l+exposure depth D/velocity v). Specifically, a greater weight wi is assigned to divided areas i showing a road surface slightly ahead of the mobile body 10, vehicles on the road surface, and buildings and others slightly ahead of the mobile body 10.

On the other hand, a smaller weight is assigned to a divided area i that is predicted to be absent in the captured image after the time lag l has passed (a divided area i predicted to go out of the angle of view of the imaging unit 211 by the time when the time lag l has passed). For example, a smaller weight is assigned to a divided area whose lifetime ti is shorter than the time lag l. Specifically, for example, a smaller weight wi is assigned to divided areas i around the right and left ends and the four corners of the captured image Pi. Furthermore, for example, a smaller weight wi is assigned to a divided area i that is distant from the mobile body 10. Specifically, for example, a smaller weight wi is assigned to a divided area i that shows the sky or a region around the vanishing point of the road.

Then, in accordance with the aforementioned equation (1), the wave-detection value calculating unit 232 calculates the wave-detection value by calculating the weighted average of brightness levels of individual divided areas i using the weight wi assigned to each divided area i.

Note that the function f may be manually created and tuned, or may be generated by using machine learning.

Furthermore, for example, one or more of the arguments of the function f, namely the time lag l, the exposure depth D, the velocity v of the mobile body 10, and the angular velocity co of the mobile body 10 can be omitted.

<Second Method for Calculating Wave-Detection Value>

Figure 11:
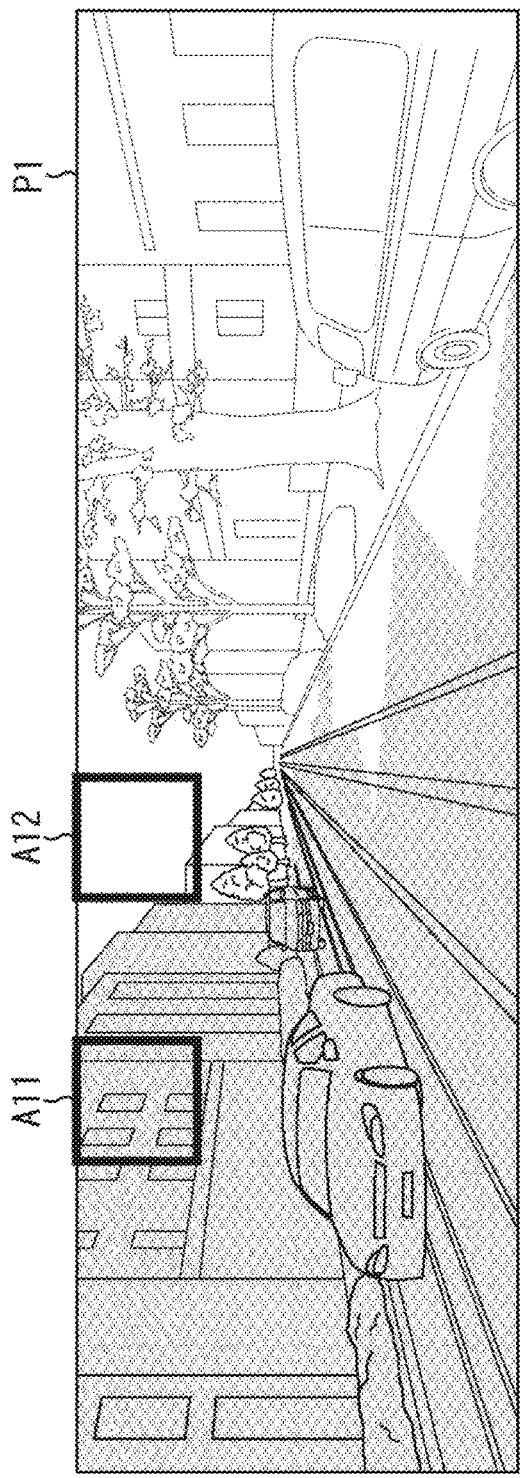
FIG. 11 is a diagram for explaining a parameter based on an image gradient.

Next, the following describes a second method for calculating the wave-detection value with reference to FIGS. 10 and 11.

The second calculation method includes obtaining, in addition to a weight wi, a parameter φi indicating the importance and the like of each divided area i and setting the weight of each divided area i to the parameter φi×the weight wi.

For example, the weight setting unit 231 sets the parameter φi on the basis of the type of the largest subject in size among the subjects in each divided area i with reference to the parameter table shown in FIG. 10. For example, a higher parameter φi is given to a subject that more highly needs to be recognized, such as a person, a vehicle, a road surface, a sign, and the like. In contrast, for example, a lower parameter φi is given to a subject that less needs to be recognized, such as the sky, a tree, and the like.

Alternatively, for example, the weight setting unit 231 sets the parameter φi of each divided area i in accordance with the following expression (3):

$$\varphi i = \Sigma \text{grad}(u,v) \quad (3)$$

where grad (u,v) represents a gradient of a brightness level (or pixel value) of the pixel at the coordinates (u,v) in the divided area i, and the parameter φi is an image gradient of the divided area i.

Therefore, the parameter φi is a greater value as the divided area i has a greater image gradient, or specifically, for example, the brightness level (or pixel value) in the divided area i varies to a greater extent. In contrast, the parameter φi is a smaller value as the divided area i has a smaller image gradient, or specifically, for example, the brightness level (or pixel value) in the divided area i varies to a smaller extent.

In general, a divided area i having a greater image gradient includes an object closer to the mobile body 10 and shows the object clearly. On the other hand, in general, an area having a smaller image gradient is an area including no object or an area including an object far from the mobile body 10 and showing the object unclearly. For example, the parameter φi for a divided area A11 that includes a building in the captured image P1 in FIG. 11 is greater than the parameter φi for a divided area A12 that includes the sky.

Then, in accordance with the following equation (4), the wave-detection value calculating unit 232 calculates the wave-detection value by calculating the weighted average of brightness levels of individual divided areas i using the weight φi*wi assigned to each divided area i.

[Mathematical 3]

$$\text{wave-detection value} = \frac{\sum_{i=1}^{n} \phi_i * w_i * x_i}{\sum_{i=1}^{n} \phi_i * w_i} \quad (4)$$

As described above, using the parameter φi assigns a greater weight to a divided area i having higher importance and including a subject that highly needs to be recognized, while assigning a smaller weight to a divided area i having lower importance without including any subject that highly needs to be recognized, whereby the wave-detection value is calculated.

Note that the parameter φi may be set on the basis of, for example, both the type of the subject and the image gradient. Furthermore, the parameter φi may be set, for example, by using a parameter indicating the importance or the like of another divided area i.

Note that, in any of the calculation methods, it is desirable that the wave-detection value is calculated on a captured image being a raw image that has not undergone γ correction yet.

Referring back to FIG. 3, in step S5, the error detecting unit 241 detects an error in the wave-detection value. Specifically, the error detecting unit 241 detects, as an error, a difference between the wave-detection value calculated by the wave-detection value calculating unit 232 and the target value of the wave-detection value. The error detecting unit 241 supplies data indicating an error in the wave-detection value to the exposure amount setting unit 242.

Note that the target value of the wave-detection value is set to, for example, a value between 12% and 20% (for example, 18%) of the brightness level as of the time when pixels of the imaging element in the imaging unit 211 are saturated.

In step S6, the exposure amount setting unit 242 sets a target value of the exposure amount. For example, the exposure amount setting unit 242 sets the target value of the exposure amount for the imaging unit 211 on the basis of a gradual change in an error in the wave-detection value, so that the wave-detection value approximates the target value. During the process, the exposure amount setting unit 242 sets the target value of the exposure amount so as not to cause the capture image to have unnaturally changing brightness, in other words, for example, so as not to cause the captured image to become abruptly bright, abruptly dark, or bright and dark repeatedly. For example, the exposure amount setting unit 242 gradually changes the target value of the exposure amount or provides a time period in which the target value of the exposure amount is not changed but fixed near the target value of the wave-detection value.

The exposure amount setting unit 242 supplies data indicating the target value of the exposure amount to the control method setting unit 243.

In step S7, the control method setting unit 243 sets an exposure control method.

The exposure amount for the imaging unit 211 is set with the exposure time (shutter speed) of the imaging element in the imaging unit 211, the gain (sensitivity) of the imaging element, and the aperture size. On the other hand, for example, excessively increasing the gain causes the captured image to have more noises, while lengthening the exposure time causes the captured image to have a greater blur.

Therefore, the control method setting unit 243 appropriately sets allocation (exposure time, gain, and aperture) for the exposure control method so that the exposure amount reaches the target value while noises and blurs in the captured image are suppressed.

The control method setting unit 243 supplies the target value of the exposure amount and data indicating the allocation for the exposure control method to the control signal generating unit 244.

In step S8, the imaging system 201 performs exposure control.

Specifically, the control signal generating unit 244 calculates the control amounts of exposure time, gain, and aperture size on the basis of the target value of the exposure amount and of the allocation for the exposure control method. The control signal generating unit 244 supplies a control signal indicating the calculated control amounts of exposure time, gain, and aperture to the imaging unit 211.

The imaging unit 211 adjusts the exposure time, the gain, and the aperture size on the basis of the control signal.

Subsequently, the processing returns to step S1 to execute the process steps starting from step S1.

As described above, a weight is assigned to each divided area i in a captured image to calculate a wave-detection value, and exposure control is performed on the basis of the calculated wave-detection value. As a result, exposure is quickly adjusted for a subject in the divided area i to which a greater weight is assigned. Therefore, for example, the exposure can be quickly adjusted for a subject that is dominant or highly needs to be recognized in the capture image that is taken while the exposure is actually controlled on the basis of a captured image that was taken a short time ago, whereby the occurrence of blown-out highlights and blocked-up shadows can be suppressed. Consequently, the mobile body 10 can perform self-position estimation, obstacle recognition, and the like with higher accuracy.

3. Second Embodiment

A second embodiment of the present technology will now be described with reference to FIGS. 12 to 16.

Note that, as with the first embodiment, the second embodiment mainly relates to processing by the data acquisition unit 102 in the mobile body control system 100 in FIG. 1.

<Example Configuration of Imaging System>

Figure 12:
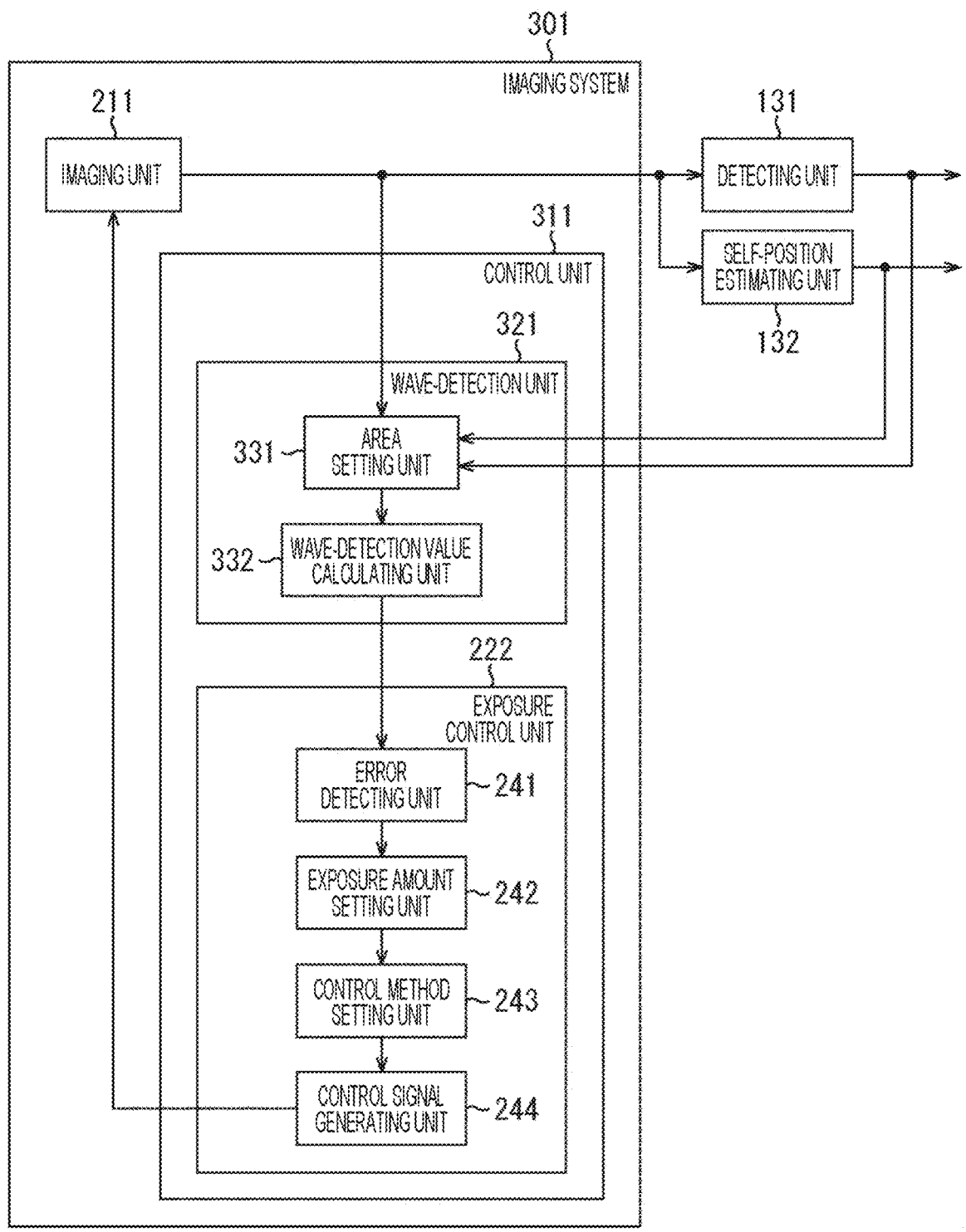
FIG. 12 is a block diagram illustrating a second embodiment of an imaging system to which the present technology is applied.

FIG. 12 is a block diagram illustrating an example configuration of an imaging system 301, which represents the second embodiment of the present technology. Note that the portions in the figure corresponding to the portions in the imaging system 201 in FIG. 2 are given the same reference numerals, and descriptions of these portions are omitted as appropriate.

The imaging system 301 is different from the imaging system 201 in that a control unit 311 is provided instead of the control unit 212. The control unit 311 is different from the control unit 212 in that a wave-detection unit 321 is provided instead of the wave-detection unit 221.

The wave-detection unit 321 includes an area setting unit 331 and a wave-detection value calculating unit 332.

As described later, the area setting unit 331 sets a target area (hereinafter referred to as a wave-detection area) for which a wave-detection value is detected in a captured image. The area setting unit 331 supplies the captured image and data indicating the wave-detection area to the wave-detection value calculating unit 332.

The wave-detection value calculating unit 332 calculates a wave-detection value on the basis of the brightness level of the wave-detection area in the captured image. The wave-detection value calculating unit 332 supplies a wave-detection signal indicating the wave-detection value to the error detecting unit 241.

<Exposure Control Process>

Figure 13:
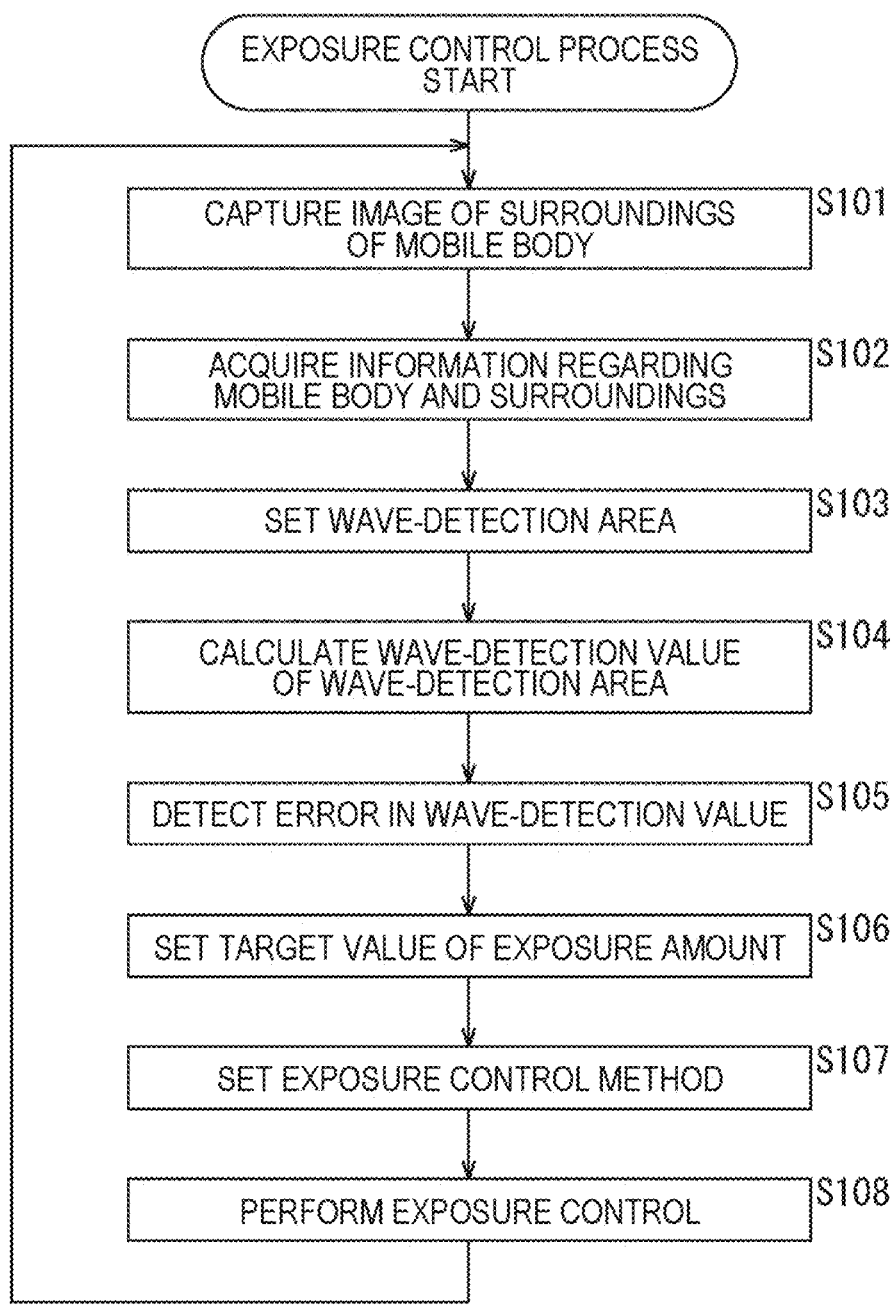
FIG. 13 is a flowchart for explaining an exposure control process performed by the imaging system in FIG. 12.

Referring to the flowchart in FIG. 13, the following describes an exposure control process performed by the imaging system 301.

Note that, for example, the process is started when the imaging system 301 is powered on and is exited when the imaging system 301 is powered off.

In step S101, an image of surroundings of the mobile body 10 is captured as with the processing in step S1 in FIG. 3.

In step S102, information regarding the mobile body 10 and the surroundings is acquired as with the processing in step S2 in FIG. 3.

In step S103, the area setting unit 331 sets a wave-detection area.

For example, the area setting unit 331 predicts the lifetime ti of each divided area i in the captured image through processing similar to the above-described processing in step S3 in FIG. 3. Then, the area setting unit 331 sets the wave-detection area in the captured image on the basis of the lifetime ti of each divided area i.

Figure 14:
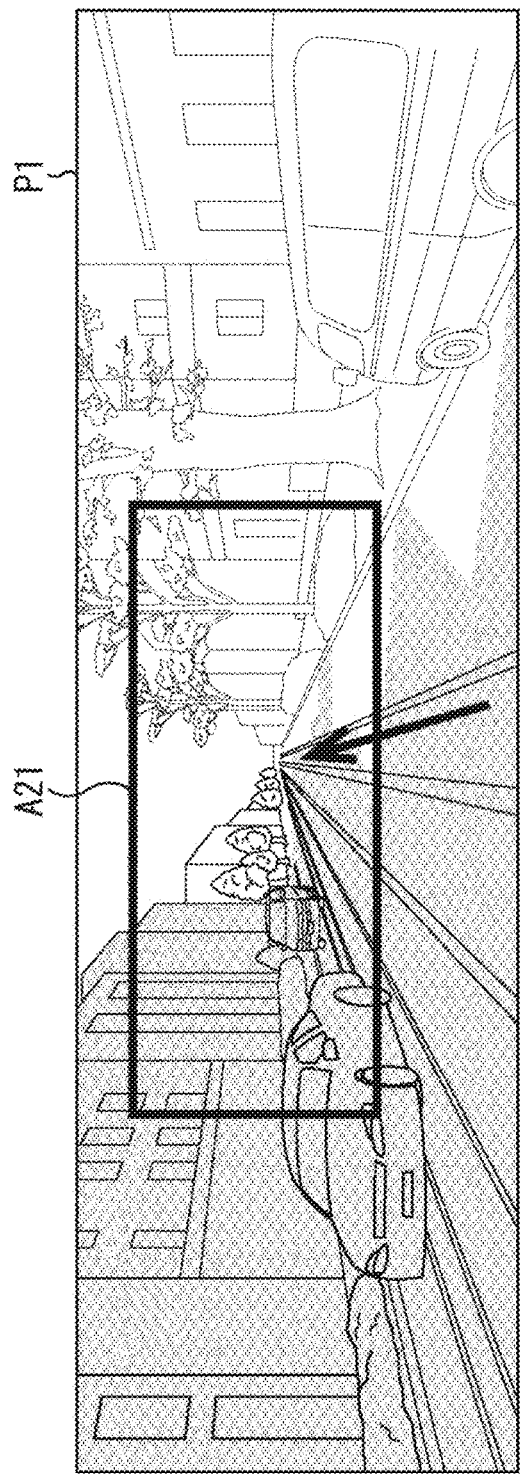
FIG. 14 is a diagram for explaining a first method for setting a wave-detection area.

For example, the area setting unit 331 sets, as the wave-detection area, an area that includes divided areas i each having the lifetime ti equal to or greater than a predetermined threshold. For example, as illustrated in FIG. 14, in a case where the mobile body 10 is moving in the arrow direction, a rectangular area A21 approximately in the center of the captured image P1 is set as the wave-detection area.

Note that the threshold used for setting the wave-detection area may be a fixed value or a variable value. In the case of a variable value, the threshold is set on the basis of, for example, the time lag l, the exposure depth D, the velocity v of the mobile body 10, and so on in the equation (3) described above. For example, the time lag l or (time lag l+exposure depth D/velocity v) is set as the threshold.

Alternatively, for example, the area setting unit 331 predicts an area, which is included in the current captured image and corresponds to a captured image as of the time after a predetermined target time has passed, in accordance with a predetermined algorithm and on the basis of the movement of the mobile body 10 (for example, the velocity, angular velocity, and the like), captured images, and the like. Then, the area setting unit 331 sets the predicted area as the wave-detection area.

Figure 15:
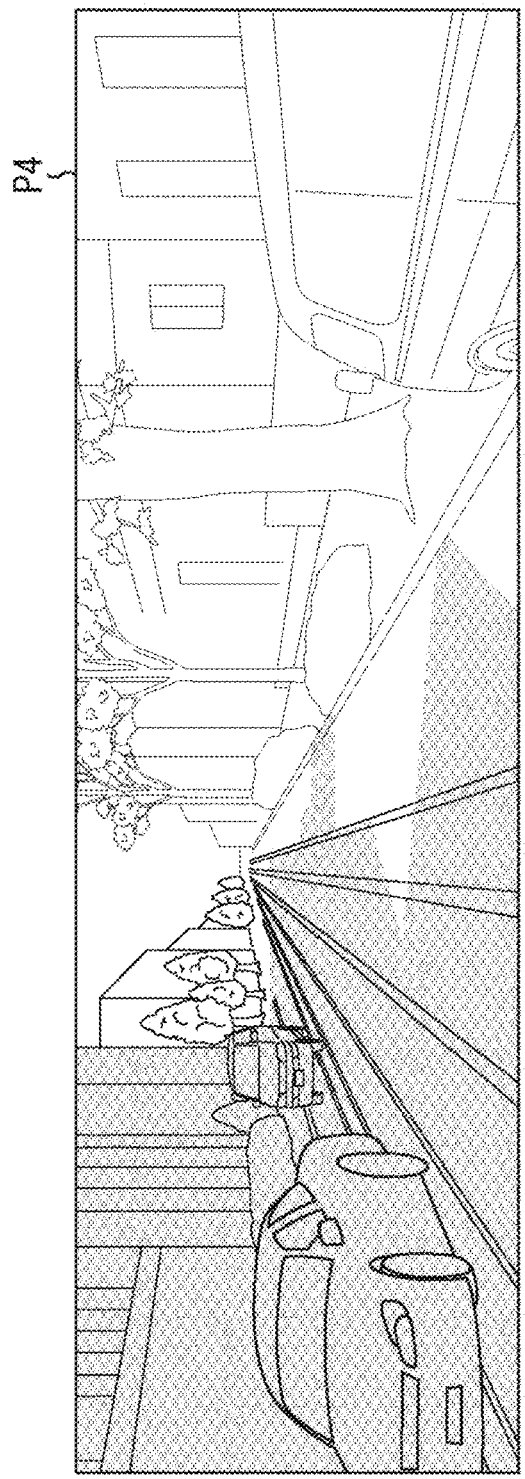
FIG. 15 is a diagram for explaining a second method for setting a wave-detection area.
Figure 16:
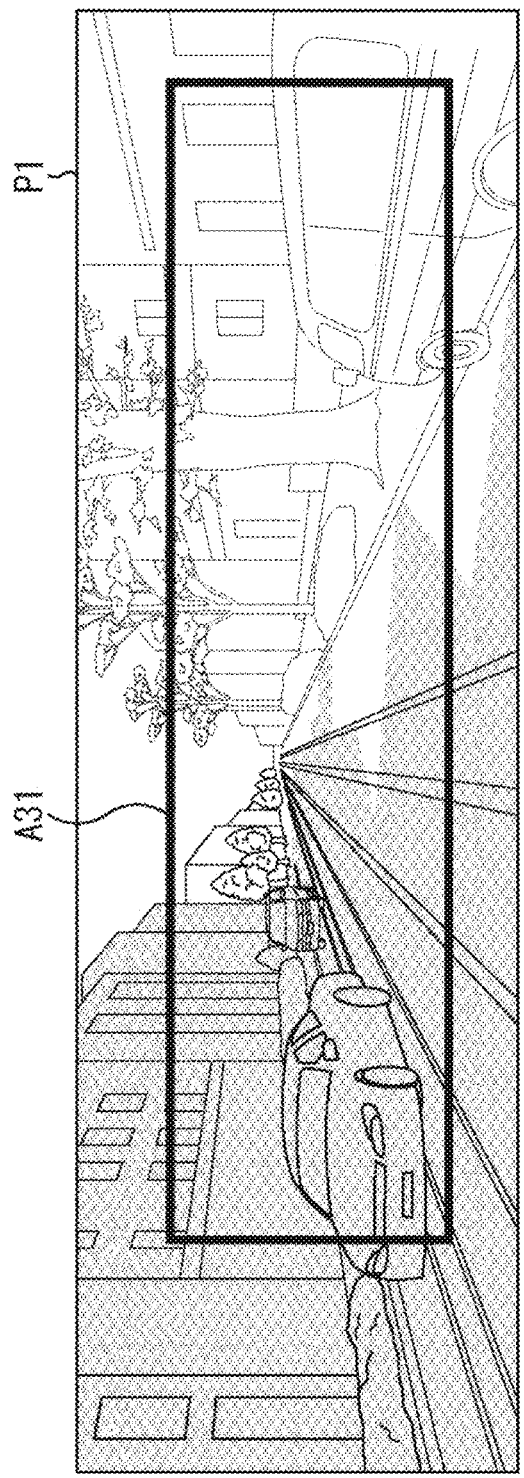
FIG. 16 is a diagram for explaining the second method for setting a wave-detection area.

For example, FIG. 15 schematically shows an example of a captured image P4 that is taken when the target time has passed since the captured image P1 was taken. In this example, for example, before the captured image P4 is taken, the area setting unit 331 predicts an area A31 in the captured image P1, the area A31 corresponding to the captured image P4. That is, the area A31 is an area that is included in the captured image P1 and is predicted to be shown on the captured image P4 to be taken after the target time. Then, the area setting unit 331 sets the area A31 as the wave-detection area.

Note that the algorithm is generated by machine learning, for example. Furthermore, the target time may be a fixed value or a variable value. In the case of a variable value, the target time is set on the basis of, for example, the time lag l, the exposure depth D, the velocity v of the mobile body 10, and so on in the equation (3) described above. For example, the time lag l or (time lag l+exposure depth D/velocity v) is set as the target time.

Note that the wave-detection area is not necessarily limited to a rectangular shape but may in a shape other than a rectangle.

Furthermore, for example, an area including a subject that highly needs to be recognized and being of high importance may be added to the wave-detection area in addition to the wave-detection area set by the above-described method.

In step S104, the wave-detection value calculating unit 332 calculates the wave-detection value of the wave-detection area. For example, the wave-detection value calculating unit 332 calculates, as the wave-detection value, the average of brightness levels of individual pixels in the wave-detection area in the captured image. This wave-detection value is equal to a value obtained by setting the weight of the wave-detection area in the captured image to 1, setting the weights of the areas other than the wave-detection area (the areas predicted to go out of the angle of view of the imaging unit 211 within a predetermined time) to 0, and calculating the average of brightness levels in the captured image except the areas to which the weight of 0 is assigned.

In steps S105 to S108, processing similar to the processing in steps S5 to S8 in FIG. 3 is carried out. Subsequently, the processing returns to step S101 to execute the process steps starting from step S101.

As described above, a wave-detection area is set, a wave-detection value is calculated on the basis of the brightness level of the wave-detection area, and exposure control is performed on the basis of the calculated wave-detection value. As a result, the exposure can be quickly adjusted for a subject within the wave-detection area excluding subjects outside the wave-detection area. The exposure can be quickly adjusted for a subject that is dominant or highly needs to be recognized in the capture image that is taken while the exposure is actually controlled on the basis of a captured image that was taken a short time ago, whereby the occurrence of blown-out highlights and blocked-up shadows can be suppressed. Consequently, the mobile body 10 can perform self-position estimation, obstacle recognition, and the like with higher accuracy.

4. Modifications

The following describes modifications of the above-described embodiments of the present technology.

For example, the divided area i may be in a shape other than a rectangle although the foregoing describes examples in which the divided area i is rectangular.

Furthermore, for example, the divided area i can be made up of a single pixel.

Moreover, for example, the first embodiment and the second embodiment can be combined. For example, the wave-detection area may be divided into a plurality of divided areas and each divided area may be weighted to calculate the wave-detection value.

5. Others

<Example Configuration of Computer>

The aforementioned series of process steps can be executed by hardware, or can be executed by software. In a case where the series of process steps is executed by software, a program included in the software is installed in the computer. Here, examples of the computer include a computer incorporated in dedicated hardware, a general-purpose personal computer capable of executing various functions by installing various programs therein, and the like.

Figure 17:
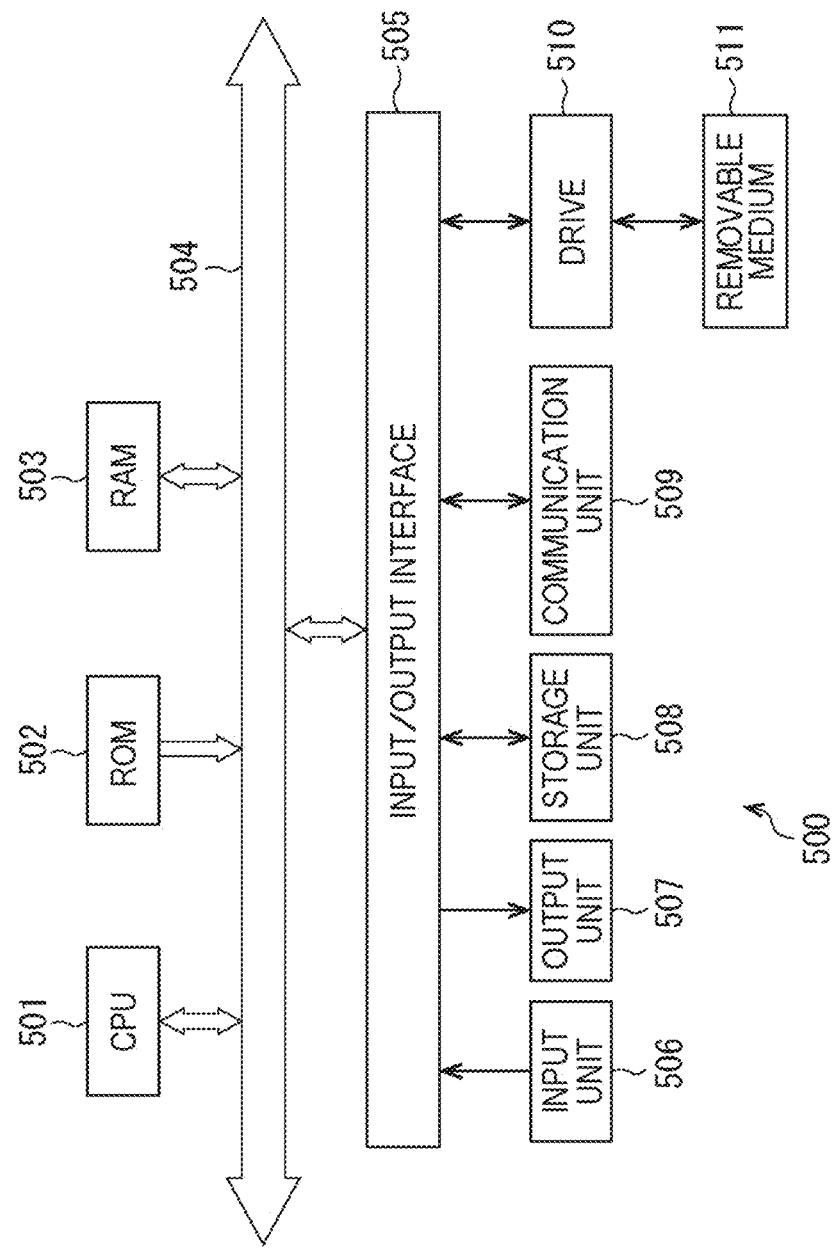
FIG. 17 is a diagram illustrating an example configuration of a computer.

FIG. 17 is a block diagram illustrating an example hardware configuration of a computer in which the aforementioned series of process steps is executed by programs.

In a computer 500, a central processing unit (CPU) 501, a read only memory (ROM) 502, and a random access memory (RAM) 503 are connected to one another by a bus 504.

Moreover, an input/output interface 505 is connected to the bus 504. An input unit 506, an output unit 507, a recording unit 508, a communication unit 509, and a drive 510 are connected to the input/output interface 505.

The input unit 506 includes an input switch, a button, a microphone, an imaging element, and the like. The output unit 507 includes a display, a speaker, and the like. The recording unit 508 includes a hard disk, a non-volatile memory, and the like. The communication unit 509 includes a network interface and the like. The drive 510 drives a removable medium 511 such as a magnetic disk, an optical disk, a magneto-optical disk, a semiconductor memory, or the like.

In the computer 500 configured as above, the CPU 501 performs the aforementioned series of process steps by, for example, loading a program stored in the recording unit 508 into the RAM 503 via the input/output interface 505 and the bus 504 and executing the program.

The program to be executed by the computer 500 (CPU 501) can be provided in the form of, for example, a package medium recorded in the removable medium 511. Furthermore, the program can be provided via a wired or wireless transmission medium such as a local area network, the Internet, or digital satellite broadcasting.

In the computer 500, the program can be installed in the recording unit 508 via the input/output interface 505 by loading the removable medium 511 into the drive 510. Furthermore, the program can also be received by the communication unit 509 via a wired or wireless transmission medium to be installed in the recording unit 508. Moreover, the program can be pre-installed in the ROM 502 or the recording unit 508.

Note that the programs executed by the computer may be programs for process steps to be performed in time series in the order described herein, or may be programs for process steps to be performed in parallel or on an as-needed basis when, for example, a call is made.

Furthermore, a system herein means a set of a plurality of components (apparatuses, modules (parts), and the like) regardless of whether or not all the components are within the same housing. Therefore, either of a plurality of apparatuses contained in separate housings and connected via a network and one apparatus in which a plurality of modules is contained in one housing is a system.

Moreover, embodiments of the present technology are not limited to the above-described embodiments, and various modifications can be made thereto without departing from the gist of the present technology.

For example, the present technology can be in a cloud computing configuration in which one function is distributed among, and handled in collaboration by, a plurality of devices via a network.

Furthermore, each of the steps described above with reference to the flowcharts can be executed not only by one device but also by a plurality of devices in a shared manner.

Moreover, in a case where one step includes a plurality of processes, the plurality of processes included in the one step can be executed not only by one device but also by a plurality of devices in a shared manner.

<Examples of Configuration Combination>

The present technology can be in any of the following configurations.

(1)

An exposure control device including:

a wave-detection unit that calculates a wave-detection value, in a captured image taken by an imaging unit, by assigning a smaller weight to an area that is predicted to go out of an angle of view of the imaging unit within a predetermined time; and an exposure control unit that performs exposure control of the imaging unit on the basis of the wave-detection value.

(2)

The exposure control device according to (1), in which the wave-detection unit calculates the wave-detection value on the basis of a lifetime of each of a plurality of areas in the captured image.

(3)

The exposure control device according to (2), in which the wave-detection unit sets a weight of each of the areas on the basis of the lifetime and calculates the wave-detection value on the basis of a brightness level and the weight of each of the areas.

(4)

The exposure control device according to (3), in which the wave-detection unit calculates the wave-detection value by obtaining a weighted average of the brightness level of each of the areas using the weight.

(5)

The exposure control device according to (3) or (4), in which the wave-detection unit sets the weight on the basis of, in addition to the lifetime, at least one of a time required for the exposure control, a distance at which the exposure is to be adjusted, a velocity of a mobile body that includes the imaging unit, or an angular velocity of the mobile body.

(6)

The exposure control device according to any one of (3) to (5), in which the wave-detection unit sets the weight further on the basis of a type of a subject in the areas.

(7)

The exposure control device according to any one of (3) to (6), in which the wave-detection unit sets the weight further on the basis of an image gradient in the areas.

(8)

The exposure control device according to (2), in which the wave-detection unit sets, as a wave-detection area, an area of part of the captured image on the basis of the lifetime of each of the areas, and calculates the wave-detection value on the basis of a brightness level of the wave-detection area.

(9)

The exposure control device according to (8), in which the wave-detection unit sets, as the wave-detection area, the area having the lifetime equal to or greater than a predetermined threshold.

(10)

The exposure control device according to (1), in which the wave-detection unit sets, as a wave-detection area, an area of part of the captured image on the basis of movement of a mobile body that includes the imaging unit and of the captured image, and calculates the wave-detection value on the basis of a brightness level of the wave-detection area.

(11)

The exposure control device according to (10), in which the wave-detection unit sets, as the wave-detection area, an area that is predicted to be imaged by the imaging unit after a predetermined time.

(12)

The exposure control device according to any one of (1) to (11), in which the wave-detection unit calculates the wave-detection value excluding an area that is predicted to go out of the angle of view of the imaging unit within the predetermined time.

(13)

An exposure control method including:

calculating a wave-detection value, in a captured image taken by an imaging unit, by assigning a smaller weight to an area that is predicted to go out of an angle of view of the imaging unit within a predetermined time; and performing exposure control of the imaging unit on the basis of the wave-detection value.

(14)

A program configured to cause a computer to execute processes of:

calculating a wave-detection value, in a captured image taken by an imaging unit, by assigning a smaller weight to an area that is predicted to go out of an angle of view of the imaging unit within a predetermined time; and performing exposure control of the imaging unit on the basis of the wave-detection value.

(15)

An imaging device including:

an imaging unit;

a wave-detection unit that calculates a wave-detection value, in a captured image taken by the imaging unit, by assigning a smaller weight to an area that is predicted to go out of an angle of view of the imaging unit within a predetermined time; and an exposure control unit that performs exposure control of the imaging unit on the basis of the wave-detection value.

(16)

A mobile body including:

an imaging unit;

a wave-detection unit that calculates a wave-detection value, in a captured image taken by the imaging unit, by assigning a smaller weight to an area that is predicted to go out of an angle of view of the imaging unit within a predetermined time;

an exposure control unit that performs exposure control of the imaging unit on the basis of the wave-detection value; and a movement control unit that performs movement control on the basis of the captured image.

Note that the effects described herein are examples only and are not restrictive, and other effects may be provided.

REFERENCE SIGNS LIST

10 Mobile body
100 Mobile body control system
102 Data acquisition unit
131 Detecting unit
132 Self-position estimating unit 141 Mobile body external information detecting unit
143 Mobile body state detecting unit
201 Imaging system
211 Imaging unit
212 Control unit
221 Wave-detection unit
222 Exposure control unit
231 Weight setting unit
232 Wave-detection value calculating unit
241 Error detecting unit
242 Exposure amount setting unit
243 Control method setting unit
244 Control signal generating unit
301 Imaging system
311 Control unit
321 Wave-detection unit
331 Area setting unit
332 Wave-detection value calculating unit

The invention claimed is:

1. An exposure control device comprising:
    wave-detection circuitry configured to calculate a wave-detection value, in a captured image taken by a camera, by assigning a smaller weight to an area that is predicted to go out of an angle of view of the camera within a predetermined time; and
    exposure control circuitry configured to perform exposure control of the camera on a basis of the wave-detection value, wherein
    the wave-detection circuitry calculates the wave-detection value on a basis of a lifetime of each of a plurality of areas in the captured image.

2. The exposure control device according to claim 1, wherein
    the wave-detection circuitry sets a weight of each of the areas on a basis of the lifetime and calculates the wave-detection value on a basis of a brightness level and the weight of each of the areas.

3. The exposure control device according to claim 2, wherein
    the wave-detection circuitry calculates the wave-detection value by obtaining a weighted average of the brightness level of each of the areas using the weight.

4. The exposure control device according to claim 2, wherein
    the wave-detection circuitry sets the weight on a basis of, in addition to the lifetime, at least one of a time required for the exposure control, a distance at which the exposure is to be adjusted, a velocity of a mobile body that includes the camera, or an angular velocity of the mobile body.

5. The exposure control device according to claim 2, wherein
    the wave-detection circuitry sets the weight further on a basis of a type of a subject in the areas.

6. The exposure control device according to claim 2, wherein
    the wave-detection circuitry sets the weight further on a basis of an image gradient in the areas.

7. The exposure control device according to claim 1, wherein
    the wave-detection circuitry sets, as a wave-detection area, an area of part of the captured image on a basis of the lifetime of each of the areas, and calculates the wave-detection value on a basis of a brightness level of the wave-detection area.

8. The exposure control device according to claim 7, wherein
    the wave-detection circuitry sets, as the wave-detection area, the area having the lifetime equal to or greater than a predetermined threshold.

9. The exposure control device according to claim 1, wherein
    the wave-detection circuitry sets, as a wave-detection area, an area of part of the captured image on a basis of movement of a mobile body that includes the camera and of the captured image, and calculates the wave-detection value on a basis of a brightness level of the wave-detection area.

10. The exposure control device according to claim 9, wherein
    the wave-detection circuitry sets, as the wave-detection area, an area that is predicted to be imaged by the camera after a predetermined time.

11. The exposure control device according to claim 1, wherein
    the wave-detection circuitry calculates the wave-detection value excluding an area that is predicted to go out of the angle of view of the camera within the predetermined time.

12. An exposure control method including:
    calculating, using wave-detection circuitry a wave-detection value, in a captured image taken by a camera, by assigning a smaller weight to an area that is predicted to go out of an angle of view of the camera within a predetermined time; and
    performing, using exposure control circuitry, exposure control of the camera on a basis of the wave-detection value, wherein
    the wave-detection value is calculated on a basis of a lifetime of each of a plurality of areas in the captured image.

13. A non-transitory computer readable medium including executable instructions, which when executed by a computer cause the computer to execute an exposure control method, the method comprising
    calculating a wave-detection value, in a captured image taken by a camera, by assigning a smaller weight to an area that is predicted to go out of an angle of view of the camera within a predetermined time; and
    performing exposure control of the camera on a basis of the wave-detection value, wherein
    the wave-detection value is calculated on a basis of a lifetime of each of a plurality of areas in the captured image.

14. An imaging device comprising:
    a camera;
    wave-detection circuitry configured to calculate a wave-detection value, in a captured image taken by the camera, by assigning a smaller weight to an area that is predicted to go out of an angle of view of the camera within a predetermined time; and
    exposure control circuitry configured to perform exposure control of the camera, on a basis of the wave-detection value, wherein
    the wave-detection circuitry calculates the wave-detection value on a basis of a lifetime of each of a plurality of areas in the captured image.

15. A mobile body comprising:
    a camera;
    wave-detection circuitry configured to calculate a wave-detection value, in a captured image taken by the camera, by assigning a smaller weight to an area that is predicted to go out of an angle of view of the camera within a predetermined time;

exposure control circuitry configured to perform exposure control of the camera on a basis of the wave-detection value; and movement control circuitry configured to perform movement control on a basis of the captured image, wherein the wave-detection circuitry calculates the wave-detection value on a basis of a lifetime of each of a plurality of areas in the captured image.

* * * * *